(12) United States Patent
Felton et al.

(10) Patent No.: US 12,533,236 B2
(45) Date of Patent: Jan. 27, 2026

(54) ATTACHMENT PLATES AND IMPLANTS FOR PENILE CONSTRUCTION

(71) Applicant: Boston Scientific Scimed, Inc., Maple Grove, MN (US)

(72) Inventors: Jessica Elizabeth Felton, Minneapolis, MN (US); James Ryan Mujwid, Hudson, WI (US); Matthew Lee Nelson, Plymouth, MN (US); Marcus Graham, Prior Lake, MN (US); Jeffrey Riepe, Minnetonka, MN (US); Gregory Thomas Quirk, Shorewood, MN (US); Jonathan J. Lund, Glencoe, MN (US)

(73) Assignee: Boston Scientific Scimed, Inc., Maple Grove, MN (US)

( * ) Notice: Subject to any disclaimer, the term of this patent is extended or adjusted under 35 U.S.C. 154(b) by 1052 days.

(21) Appl. No.: 16/946,208

(22) Filed: Jun. 10, 2020

(65) Prior Publication Data

US 2020/0397583 A1 Dec. 24, 2020

Related U.S. Application Data

(60) Provisional application No. 62/863,469, filed on Jun. 19, 2019.

(51) Int. Cl.
*A61F 2/26* (2006.01)
*A61F 2/30* (2006.01)
*A61F 2/32* (2006.01)

(52) U.S. Cl.
CPC ............ *A61F 2/26* (2013.01); *A61F 2/30749* (2013.01); *A61F 2/32* (2013.01); *A61F 2002/305* (2013.01);

(Continued)

(58) Field of Classification Search
CPC .......... A61F 2/26; A61F 2/30749; A61F 2/32; A61F 2002/305; A61F 2002/30772;

(Continued)

(56) References Cited

U.S. PATENT DOCUMENTS 4,335,714 A 6/1982 Edgerton et al.
5,702,468 A * 12/1997 Goldberg .............. A61F 2/4241
623/21.12

(Continued)

FOREIGN PATENT DOCUMENTS

CN 101426444 A 5/2009
CN 103037810 A 4/2013

(Continued)

OTHER PUBLICATIONS

International Search Report and Written Opinion for PCT Application No. PCT/US2020/070140, mailed on Sep. 21, 2020, 15 pages.

(Continued)

*Primary Examiner* — Samuel G Gilbert

(74) *Attorney, Agent, or Firm* — Brake Hughes Bellermann LLP

(57) ABSTRACT

An implantable device for penile construction includes an anchor plate configured to be coupled to a pelvic bone of a patient, where the anchor plate has an attachment interface configured to be coupled to a penile prosthesis after the anchor plate is coupled to the pelvic bone.

10 Claims, 22 Drawing Sheets

(52) U.S. Cl.
CPC ............... *A61F 2002/30772* (2013.01); *A61F 2002/3082* (2013.01); *A61F 2002/30879* (2013.01); *A61F 2002/30884* (2013.01); *A61F 2002/30909* (2013.01); *A61F 2002/3093* (2013.01); *A61F 2250/0003* (2013.01); *A61F 2250/0007* (2013.01)

(58) Field of Classification Search
CPC .... A61F 2002/3082; A61F 2002/30879; A61F 2002/30884; A61F 2002/30909; A61F 2002/3093; A61F 2250/0003; A61F 2250/0007; A61F 17/8066; A61F 2220/0008; A61F 2250/0006; A61F 2250/0078
See application file for complete search history.

(56) References Cited

U.S. PATENT DOCUMENTS

| | | | | |
|---|---|---|---|---|
| 5,788,627 | A * | 8/1998 | Subrini | A61F 2/26 600/38 |
| 6,475,137 | B1 * | 11/2002 | Elist | A61F 2/26 600/40 |
| 2006/0235267 | A1 | 10/2006 | George et al. | |
| 2008/0139880 | A1 * | 6/2008 | Choi | A61F 2/26 600/39 |
| 2015/0094528 | A1 | 4/2015 | Deitch et al. | |
| 2018/0098854 | A1 * | 4/2018 | Allen | A61F 2/26 |
| 2018/0098855 | A1 * | 4/2018 | Crabb | A61F 2/26 |
| 2019/0099272 | A1 * | 4/2019 | Newman | A61F 2/004 |
| 2020/0129295 | A1 | 4/2020 | Kansas et al. | |

FOREIGN PATENT DOCUMENTS

| | | |
|---|---|---|
| CN | 106388920 A | 2/2017 |
| CN | 106859751 A | 6/2017 |
| CN | 108338855 A | 7/2018 |
| CN | 109561965 A | 4/2019 |
| EP | 3873386 B1 | 11/2023 |
| WO | 2017009580 A1 | 1/2017 |

OTHER PUBLICATIONS

Communication pursuant to Article 94(3) EPC for European Application No. 20735841.7, mailed Mar. 27, 2025, 6 pages.
First Office Action for Chinese Application No. 202080045185.1 (with English translation), mailed Mar. 17, 2025, 32 pages.
Second Office Action for Chinese Application No. 202080045185.1 (with English translation), dated Oct. 29, 2025, 26 pages.

* cited by examiner

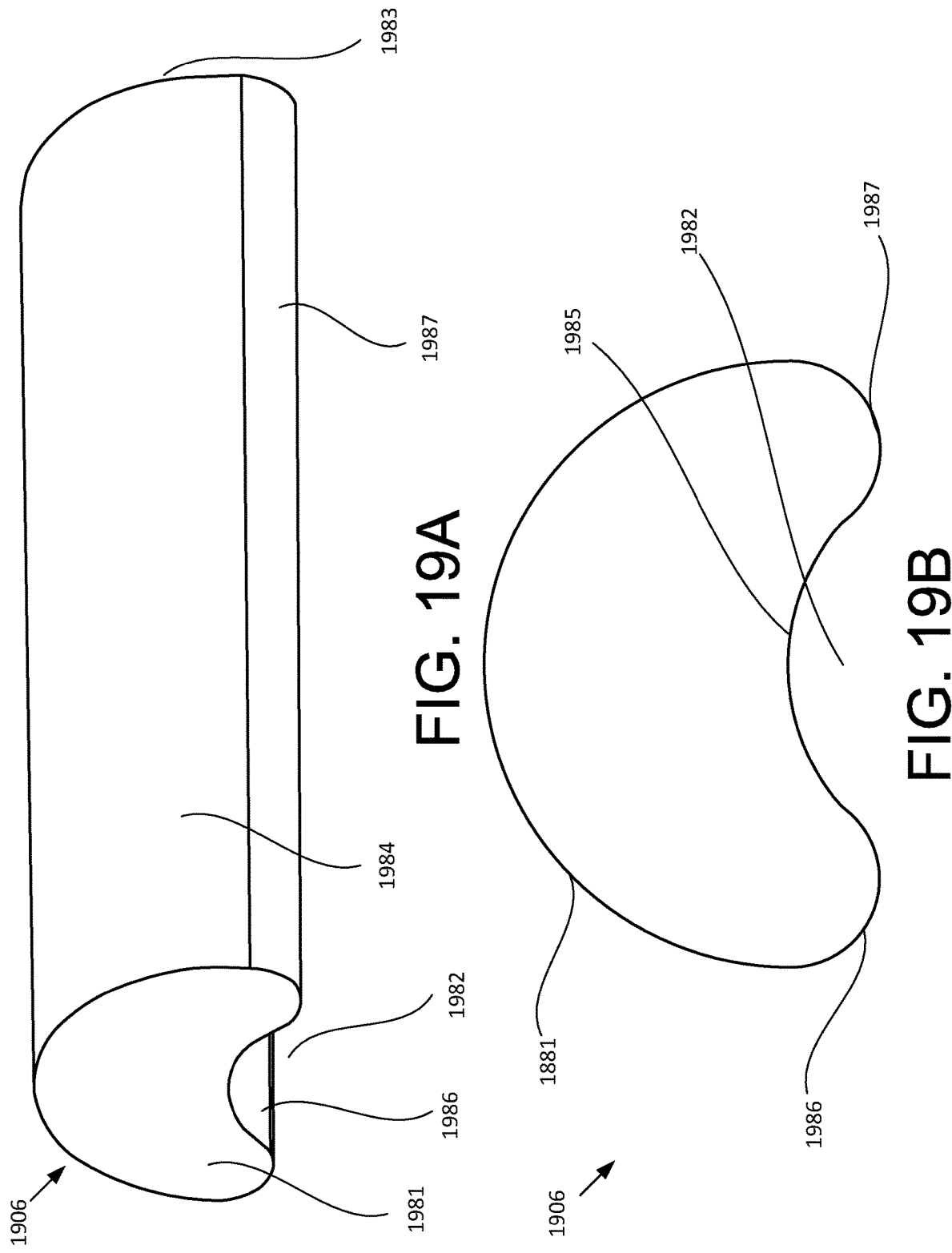

ATTACHMENT PLATES AND IMPLANTS FOR PENILE CONSTRUCTION

CROSS-REFERENCE TO RELATED APPLICATION

This application claims priority to U.S. Provisional Patent Application No. 62/863,469, filed on Jun. 19, 2019, entitled "ATTACHMENT PLATES AND IMPLANTS FOR PENILE CONSTRUCTION", the disclosure of which is incorporated by reference herein in its entirety.

TECHNICAL FIELD

This disclosure relates generally to attachment plates and implants for penile construction.

BACKGROUND

In some examples, penile prostheses for erectile dysfunction have been used off-label in penile construction or reconstruction cases such as female to male transgender, and natal males with penile reconstruction (e.g., congenital disorders, amputation (penile cancer), trauma, etc.). For example, a patient undergoes a phalloplasty procedure (e.g., single stage or multiple stages) in which a neophallus is surgically constructed from tissue grafts taken from other parts of the body. The phalloplasty procedure may be considered highly invasive with relatively high infection risks, and a patient may be open on the operating table for an extended period of time (e.g., 8+ hours). Since the neophallus is made of skin and does not contain the erectile tissues of a biological penis, the neophallus does not have the capability to achieve an erection.

A penile prosthesis may be implanted after the phalloplasty procedure. In some examples, the penile prosthesis may be a transgender specific device, or a penile prosthesis used for erectile dysfunction in natal males. However, there may be difficulties associated with how the penile prosthesis is attached to the pelvic region. In natal males, the proximal ends of the corpora cavernosa tunnel deep into the pelvic, and, in some examples, they provide the cavity in which the two cylinders of the penile prosthesis are disposed, as well as a way to prevent migration or crossover of the cylinders. In the natal males undergoing penile reconstruction due to amputation, the proximal corpora may still be intact and may serve to anchor the proximal ends of the penile prosthesis dual cylinders. However, in female-to-male (FTM) transgender individuals, natal males with birth defects, and/or severe trauma cases, these features of the proximal corpora may not be present in the same manner, and, there may be difficulties with anchoring these devices to the pelvic.

SUMMARY

According to an aspect, an implantable device for penile construction includes an anchor plate configured to be coupled to a pelvic bone of a patient, where the anchor plate has an attachment interface configured to be coupled to a penile prosthesis after the anchor plate is coupled to the pelvic bone.

According to an aspect, an implantable device for penile construction includes a penile prosthesis having a distal end portion and a proximal end portion, where the proximal end portion defines an attachment interface. The implantable device includes an anchor plate configured to be coupled to a pelvic bone of a patient, where the anchor plate has an attachment interface configured to be coupled to the attachment interface of the penile prosthesis. In some examples, the penile prosthesis includes an adjustable member configured to increase over time to assist with the creation of a neophallus.

According to an aspect, a method of implanting an implantable device for penile construction includes coupling an anchor plate to a pelvic bone of a patient, the anchor plate defining an attachment interface, and coupling a proximal end portion of a penile prosthesis to the attachment interface after the anchor plate is coupled to the pelvic bone.

BRIEF DESCRIPTION OF THE DRAWINGS

FIG. 19A illustrates a penile shaft according to an aspect.

FIG. 19B illustrates a cross-section of the penile shaft according to an aspect.

DETAILED DESCRIPTION

Detailed embodiments are disclosed herein. However, it is understood that the disclosed embodiments are merely examples, which may be embodied in various forms. Therefore, specific structural and functional details disclosed herein are not to be interpreted as limiting, but merely as a basis for the claims and as a representative basis for teaching one skilled in the art to variously employ the embodiments in virtually any appropriately detailed structure. Further, the terms and phrases used herein are not intended to be limiting, but to provide an understandable description of the present disclosure.

The terms "a" or "an," as used herein, are defined as one or more than one. The term "another," as used herein, is defined as at least a second or more. The terms "including" and/or "having", as used herein, are defined as comprising (i.e., open transition). The term "coupled" or "moveably coupled," as used herein, is defined as connected, although not necessarily directly and mechanically.

In general, the embodiments are directed to bodily implants. The term patient or user may hereafter be used for a person who benefits from the medical device or the methods disclosed in the present disclosure. For example, the patient can be a person whose body is implanted with the medical device or the method disclosed for operating the medical device by the present disclosure.

In some examples, when an implant device fails, the entire device and anchoring mechanism may need to be removed since the implant device may be integrated as a single piece. In some examples, this can leave the pelvic bone compromised (specifically if using bone screws) which leads to difficulty in placing a second device and the patient may be susceptible to an increased risk of bone infection. However, as discussed herein, the implant device may include a multiple part device, which can allow for the removal and replacement of the penile prosthesis while the anchor plate stays attached. The multiple part device may reduce the time of the procedure and/or reduce the number of potential complications for the patient.

Figure 1:
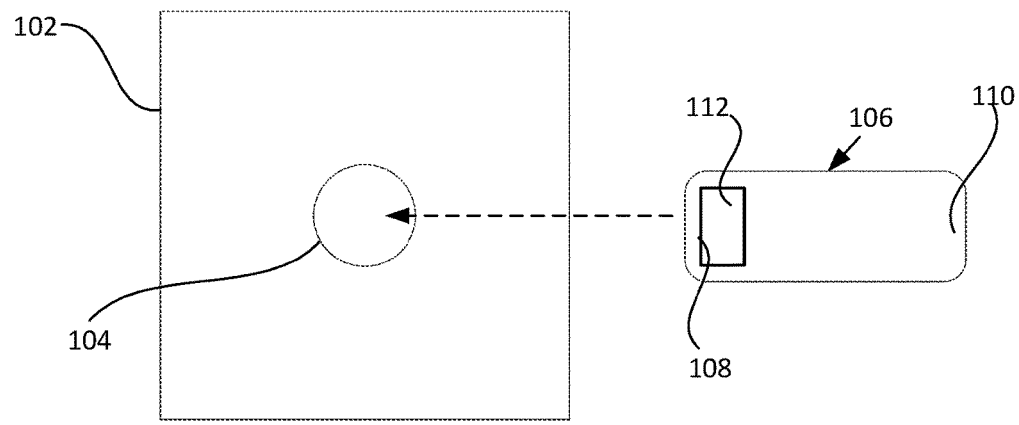
FIG. 1 illustrates an implantable device having anchor plate for penile construction according to an aspect.

FIG. 1 illustrates an implantable device 100 for penile construction according to an aspect. The implantable device 100 may be used for female to male (FTM) or natal males undergoing penile construction (or reconstruction). The implantable device 100 includes an anchor plate 102 configured to be coupled to a pelvic bone of a patient. In some examples, the anchor plate 102 is permanently coupled to the pelvic bone. In some examples, the anchor plate 102 is temporarily coupled to the pelvic bone. In some examples, the anchor plate 102 is coupled to the pelvic bone using bone screws, sutures, bone adhesive or epoxy, and/or mesh anchoring members (e.g., mesh, wires, or other) through holes drilled into the pelvic bone. In some examples, the anchor plate 102 includes tissue ingrowth materials (e.g., hydroxyapatite) to allow bone to grow into the anchor plate 102 for attachment of the anchor plate 102. In some examples, suture and/or mesh anchoring members may be placed around the pelvic bone structure or fibrous connective tissue attached to the pelvic bone.

The anchor plate 102 may be attached bilaterally or unilaterally to the pelvic bone. The anchor plate 102 may encompass a wide variety of shapes to accommodate patient pelvic anatomy and penile prosthesis attachment. The anchor plate 102 may include unique "male" and "female" versions to account for differences in pelvic anatomy and desired take-off angle and positioning of the penile prosthesis from the pelvis.

In some examples, the anchor plate 102 may include materials that are both stiff and flexible. In some examples, the anchor plate 102 defines one or more flexible areas. Each flexible area may include a material that is more flexible than the material(s) between (or surrounding) a respective flexible area. In some examples, a flexible area is defined at a center region of the anchor plate 102, where the flexible area may operate as an elastomeric flex point. In some examples, a flexible area is defined on one or more sides of the attachment interface 104. The flexible area(s) may allow for flexing at the pubic symphysis.

In some examples, the area surrounding the attachment interface 104 (e.g., where the anchor plate 102 interfaces with the elongate member 106) may include a softer material (than other areas of the anchor plate 102) in order to dampen the transfer of forces between the anchor plate 102 and the elongate member 106 during use. In some examples, the anchor plate 102 defines anchoring holes (e.g., screw holes), and the anchoring holes are reinforced with less flexible material for a relatively more secure attachment. In some examples, the anchor plate 102 includes reinforcement fibers that may be used in specific areas of the anchor plate 102. In some examples, the anchor plate 102 includes a textile or other porous substrate may be used as the flexible material or to promote tissue ingrowth in specific areas. In some examples, the anchor plate 102 may include a coated or dipped elastomeric polymer to control the tissue ingrowth in certain areas and allow for expansion of the anchor plate 102. In some examples, the anchor plate 102 includes cadaveric bone, animal biologic tissues, and materials known for tissue ingrowth properties, which may be used to help fuse the anchor plate 102 to the patient such as porous, hydroxyapatite-type of material for bone/tissue ingrowth.

The anchor plate 102 includes an attachment interface 104 configured to be coupled to an elongated member 106 of a penile prosthesis. In some examples, the elongated member 106 is configured to be inserted into a neophallus, e.g., a newly constructed shaft of skin in the shape of a penis, where the neophallus is formed from tissue donated from a body part (e.g., thigh, forearm) of the patient. In some examples, the penile prosthesis is a neophallus implant. In some examples, the penile prosthesis is a penile prosthesis originally designed for erectile dysfunction. In some examples, the penile prosthesis is an adjustable member configured to increase in length over time to assist with the creation of a neophallus. In some examples, the penile prosthesis is a penile shaft that defines one or more lumens (or a solid core), where the penile shaft is configured to accommodate the neourethra within the neophallus. In some examples, the penile prosthesis is a hydraulic penile prosthesis in which the elongated member 106 is an inflation member (e.g., a single cylinder) that receives fluid from a fluid reservoir via a pump assembly. In some examples, the penile prosthesis is a malleable penile prosthesis in which the elongated member 106 is malleable. In some examples, the penile prosthesis is a non-hydraulic mechanical penile prosthetic device.

The elongated member 106 includes a proximal end portion 108 and a distal end portion 110. In some examples, the proximal end portion 108 is a rear tip of a penile implant. The proximal end portion 108 defines an attachment interface 112 that is configured to interact with the attachment interface 104 of the anchor plate 102 (after the anchor plate 102 is attached to the pelvic bone) in order to couple the elongated member 106 to the anchor plate 102. In some examples, the coupling of the attachment interface 104 with the attachment interface 112 may allow for orbital movement of the elongated member 106. In some examples, the attachment interface 104 is coupled to the attachment interface 112 using a snap-fit (e.g., the proximal end portion 108 is snap-fitted into the anchor plate 102). In some examples, the attachment interface 104 is coupled to the attachment interface 112 using a friction fit. In some examples, the attachment interface 104 and the attachment interface 112 may define a ball and socket connection, a tongue and groove connection, or mortise and tenon mating connection.

Figure 2:
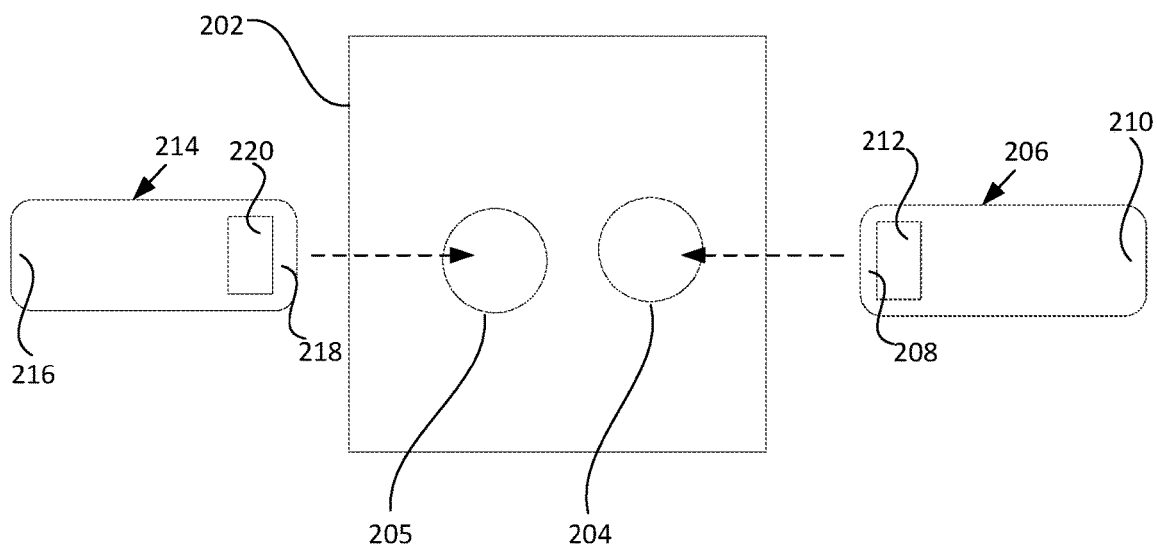
FIG. 2 illustrates an implantable device having an anchor plate for penile construction according to an aspect.

FIG. 2 illustrates an implantable device 200 for penile construction according to an aspect. The implantable device 200 may be used for female to male (FTM) or natal males undergoing penile construction (or reconstruction). The implantable device 200 includes an anchor plate 202 configured to be coupled to a pelvic bone of a patient. The anchor plate 202 is similar to the anchor plate 102 of FIG. 1 except that the anchor plate 202 includes two attachment interfaces, e.g., a first attachment interface 204 and a second attachment interface 205.

The first attachment interface 204 is configured to attach to a first elongated member 206, and the second attachment interface 205 is configured to attach to a second elongated member 214. In some examples, the first elongated member 206 and the second elongated member 214 are two-cylinder members of a penile prosthesis. In some examples, the first elongated member 206 and the second elongated member 214 are neophallus implants. In some examples, the first elongated member 206 and the second elongated member 214 are part of a penile prosthesis originally designed for erectile dysfunction. In some examples, the first elongated member 206 and the second elongated member 214 are adjustable members configured to increase in length over time to assist with the creation of a neophallus. In some examples, the first elongated member 206 and the second elongated member 214 are penile shafts that defines one or more lumens (or a solid core), where the penile shafts are configured to accommodate the neourethra within the neophallus.

The first elongated member 206 includes a distal end portion 210 and a proximal end portion 208, where the proximal end portion 208 defines an attachment interface 212. The attachment interface 212 of the first elongated member 206 is configured to attach to the first attachment interface 204 of the anchor plate 202. The second elongated member 214 includes a distal end portion 216 and a proximal end portion 218, where the proximal end portion 218 defines an attachment interface 220. The attachment interface 220 of the second elongated member 214 is configured to attach to the second attachment interface 205 of the anchor plate 202.

Figure 3:
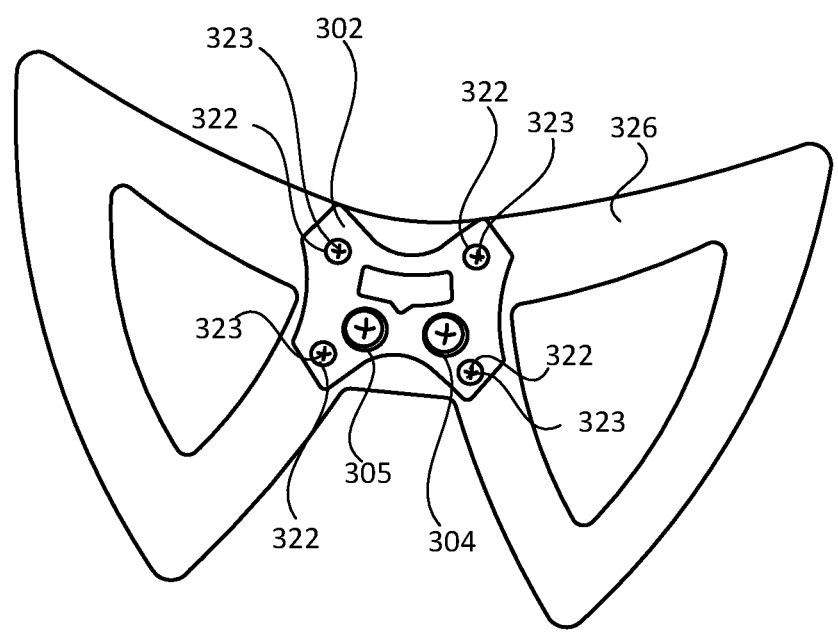
FIG. 3 illustrates an example of an anchor plate coupled to a pelvic bone according to an aspect.

FIG. 3 illustrates an anchor plate 302 attached to a pelvic bone 326 according to an aspect. The anchor plate 302 may include any of the features described with reference to the previous figures. In some examples, the anchor plate 302 includes a butterfly-shape. The anchor plate 302 includes a first attachment interface 304 and a second attachment interface 305, each of which is configured to attach (e.g., snap-fit) with a rear-tip of a cylinder member of a penile prosthesis.

Also, the anchor plate 302 defines a plurality of anchoring holes 322, and fastening members 323 (e.g., bone screws) may be inserted into the anchoring holes 322 and the pelvic bone 326 (e.g., from the front or the back of the pelvic bone 326). In some examples, the number of anchoring holes 322 (and the number of fastening members 323) is four. In some examples, the number of anchoring holes 322 is less than four. In some examples, the number of anchoring holes 322 is greater than four. In some examples, each anchoring hole 322 is disposed at a respective corner portion of the anchor plate 302.

Figure 4:
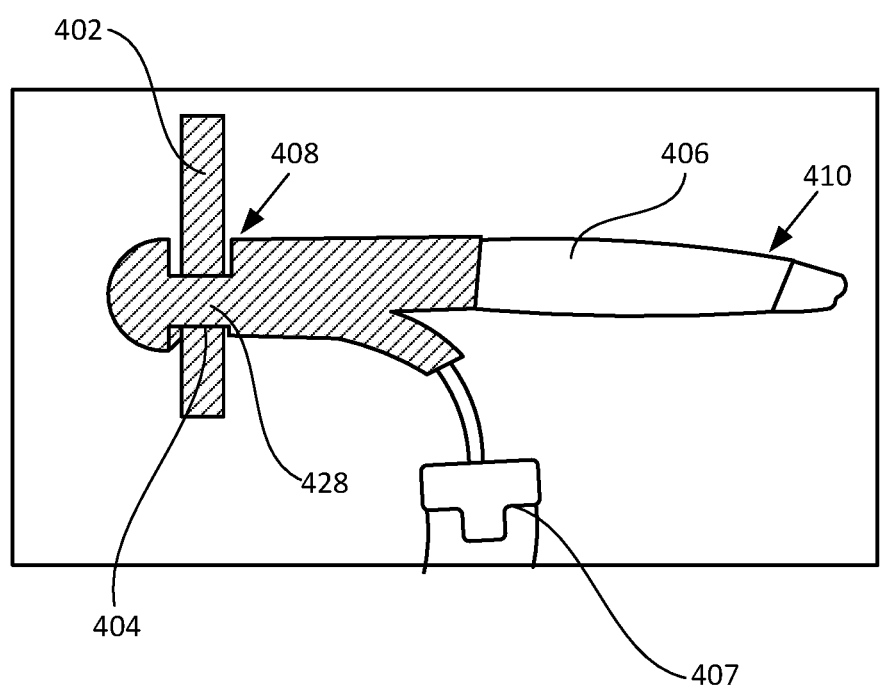
FIG. 4 illustrates an example of a cylinder member coupled to an anchor plate using a snap-fit connection according to an aspect.

FIG. 4 illustrates an anchor plate 402 attached to an elongated member 406 of a penile prosthesis. As shown in FIG. 4, the elongated member 406 is a cylinder member fluidly coupled to a pump assembly 407. The elongated member 406 includes a distal end portion 410 and a proximal end portion 408. The anchor plate 402 defines an opening 404 that is configured to hold the proximal end portion 408 of the elongated member 406. For example, the proximal end portion 408 includes a reduced portion 428 that has a diameter less than a diameter of the opening 404. The other portions of the proximal end portion 408 that are adjacent (e.g., directly adjacent) to the reduced portion 428 may have a diameter greater than the diameter of the opening 404. The proximal end portion 408 may be inserted through the opening 404 such that the reduced portion 428 is disposed within the opening 404 but the larger-diameter portions are disposed on each side of the anchor plate 402 in order to couple the elongated member 406 to the anchor plate 402 based on the snap-fit connection as shown on FIG. 4.

Figure 5:
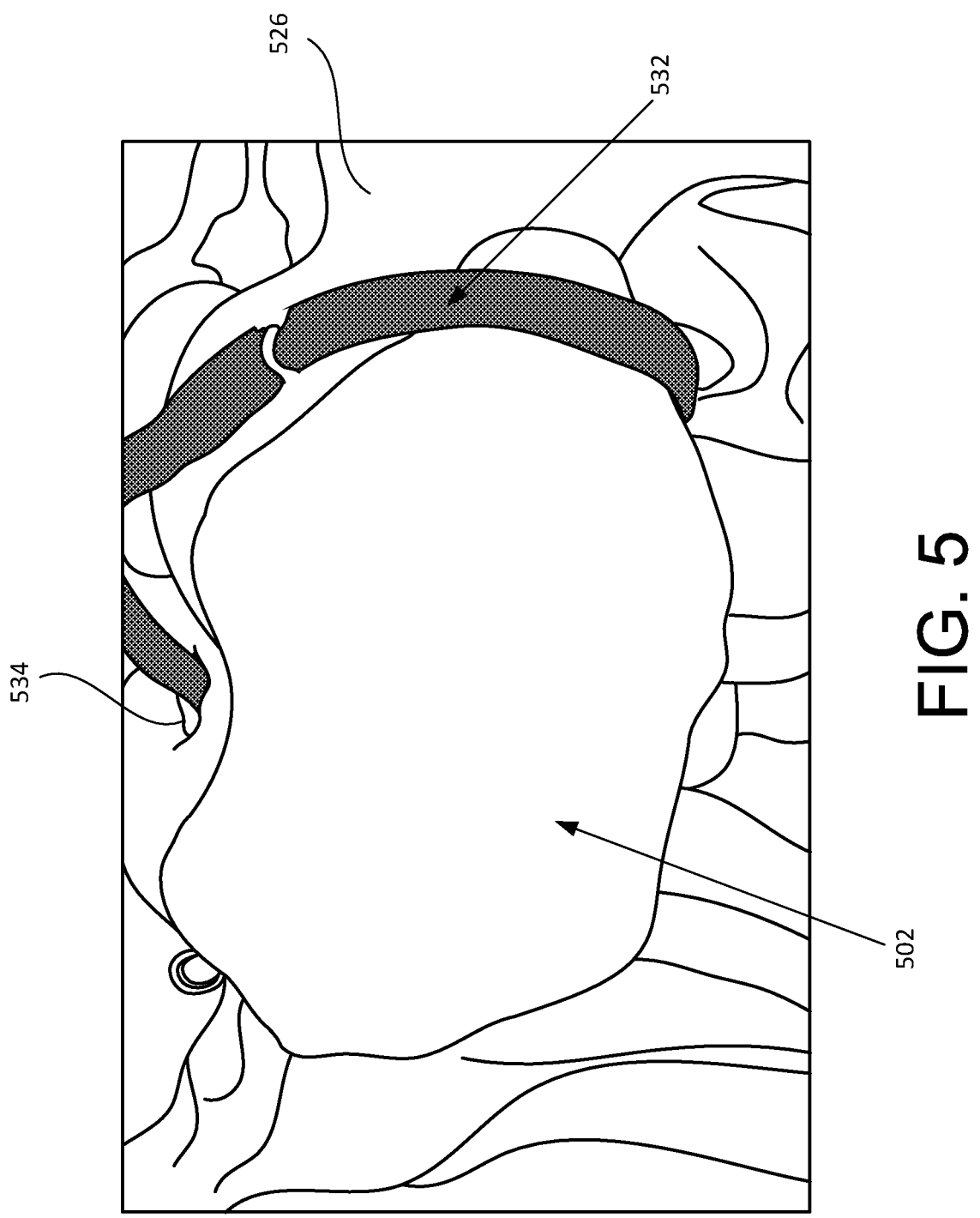
FIG. 5 illustrates an anchor plate coupled to a pelvic bone using a thread member.

FIG. 5 illustrates an anchor plate 502 coupled to a pelvic bone 526 with the use of a thread member 532 according to an aspect. In some examples, the thread member 532 includes a suture. In some examples, the thread member 532 includes a wire. In some examples, the thread member 532 includes an elongated mesh member. The anchor plate 502 may include any of the features discussed with reference to the previous figures. In some examples, a hole 534 is formed through a portion of the pelvic bone 526, and the thread member 532 is inserted through the hole 534 and placed over a portion of the anchor plate 502.

Figure 6:
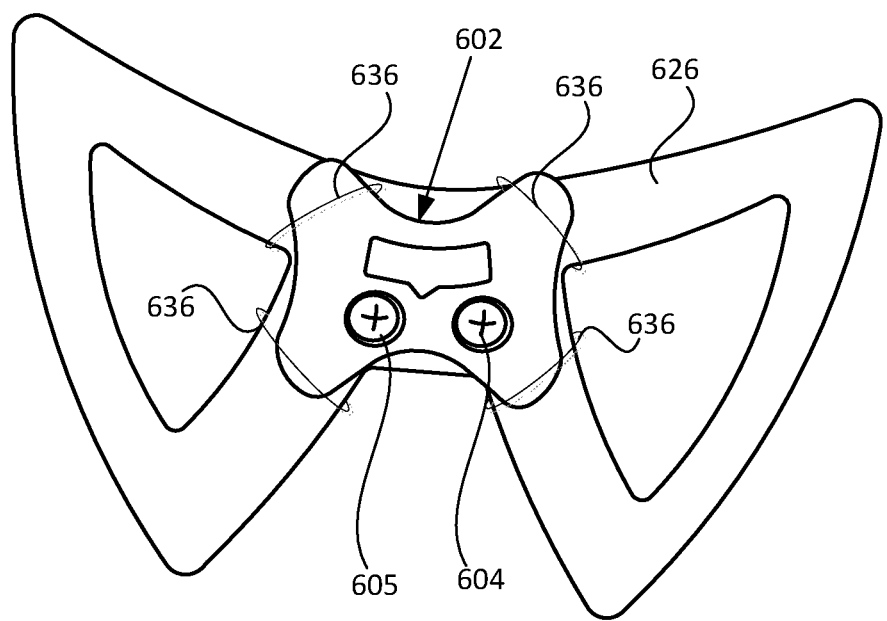
FIG. 6 illustrates an anchor plate coupled to a pelvic bone using thread members.

FIG. 6 illustrates an anchor plate 602 coupled to a pelvic bone 626 with a plurality of thread members 636 according to an aspect. In some examples, the thread members 636 include sutures. In some examples, the thread members 636 include wires. In some examples, the thread members 636 include elongated mesh members. The anchor plate 602 defines a first attachment interface 604 and a second attachment interface 605, each of which is configured to be coupled to a respective cylinder member of a penile prosthesis. In contrast to FIG. 5, a hole is not formed through the pelvic bone 626. Rather, a separate thread member 636 636 is looped around each corner portion of the anchor plate 602 and a portion of the pelvic bone 626.

Figure 7A:
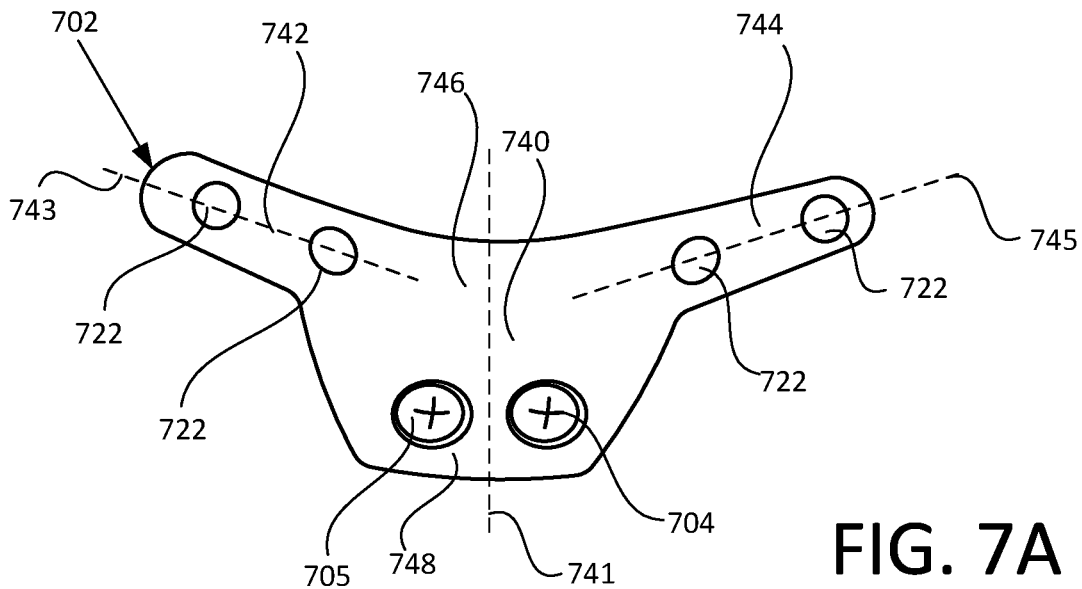
FIG. 7A illustrates an anchor plate according to an aspect.
Figure 7B:
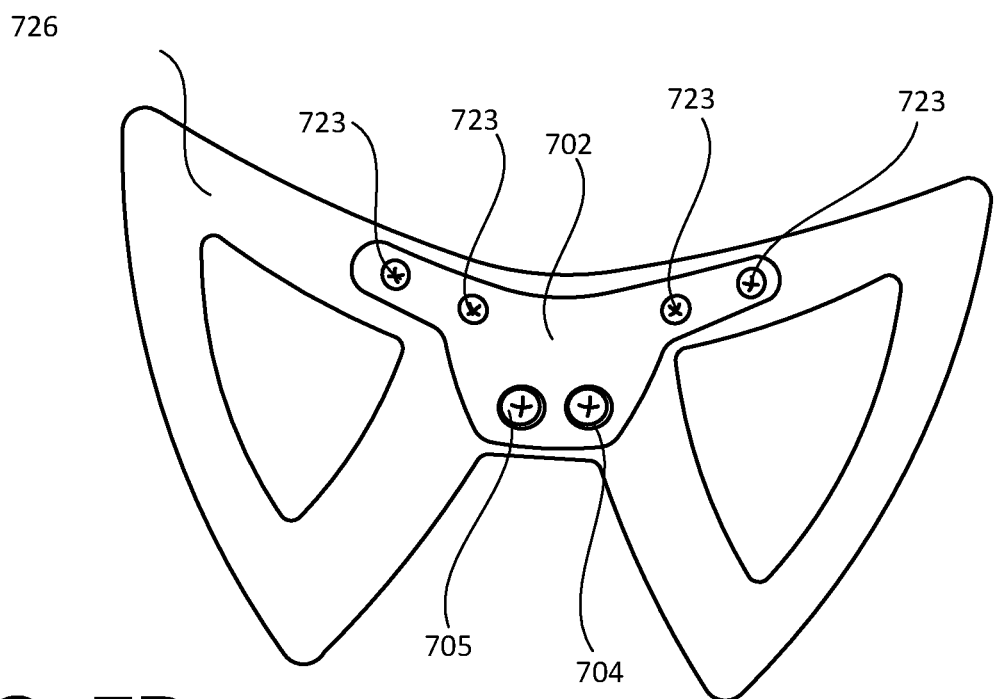
FIG. 7B illustrates the anchor plate coupled to a pelvic bone according to an aspect.

FIG. 7A illustrates an anchor plate 702 according to an aspect. FIG. 7B illustrates the anchor plate 702 coupled to a pelvic bone 726 using fastening members 723 (e.g., bone screws) according to an aspect. The anchor plate 702 may include any of the features described with reference to the previous figures. For example, the anchor plate 702 may define a first attachment interface 704 and a second attachment interface 705, each of which is configured to be coupled to a respective cylinder member of a penile prosthesis.

The anchor plate 702 may include a central portion 740, a first arm member 742 that extends from one side of the central portion 740, and a second arm member 744 that extends from the other side of the central portion 740. In some examples, the central portion 740, the first arm member 742, and the second arm member 744 are a unitary (e.g., single) body. The anchor plate defines a central axis 741. The central portion 740 includes a first end portion 746 and a second end portion 748. The central axis 741 extends between the first end portion 746 and the second end portion 748. In some examples, the anchor plate 702 is divided into halves by the central axis 741, and each half is substantially similar (or identical) to the other half. The first arm member 742 may extend from the first end portion 746 on one side of the central portion 740, and the second arm member 744 may extend from the first end portion 746 on the other side of the central portion 740. In some examples, the central portion 740 defines the first attachment interface 704 and the second attachment interface 705. In some examples, the second end portion 748 of the central portion 740 defines the first attachment interface 704 and the second attachment interface 705.

The first arm member 742 defines one or more anchoring holes 722. In some examples, the first arm member 742 defines two anchoring holes 722. Each anchoring hole 722 is configured to receive a fastening member 723 (e.g., a bone screw). In some examples, the anchoring holes 722 are spaced apart from each other and aligned along a longitudinal axis 743 of the first arm member 742. The second arm member 744 defines one or more anchoring holes 722. In some examples, the second arm member 744 defines two anchoring holes 722. Each anchoring hole 722 on the second arm member 744 is configured to receive a fastening member 723 (e.g., a bone screw). In some examples, the anchoring holes 722 are spaced apart from each other and aligned along a longitudinal axis 745 of the second arm member 744. In some examples, the longitudinal axis 743 is disposed at a non-zero (and/or non-perpendicular) angle with respect to the longitudinal axis 745.

Figure 8A:
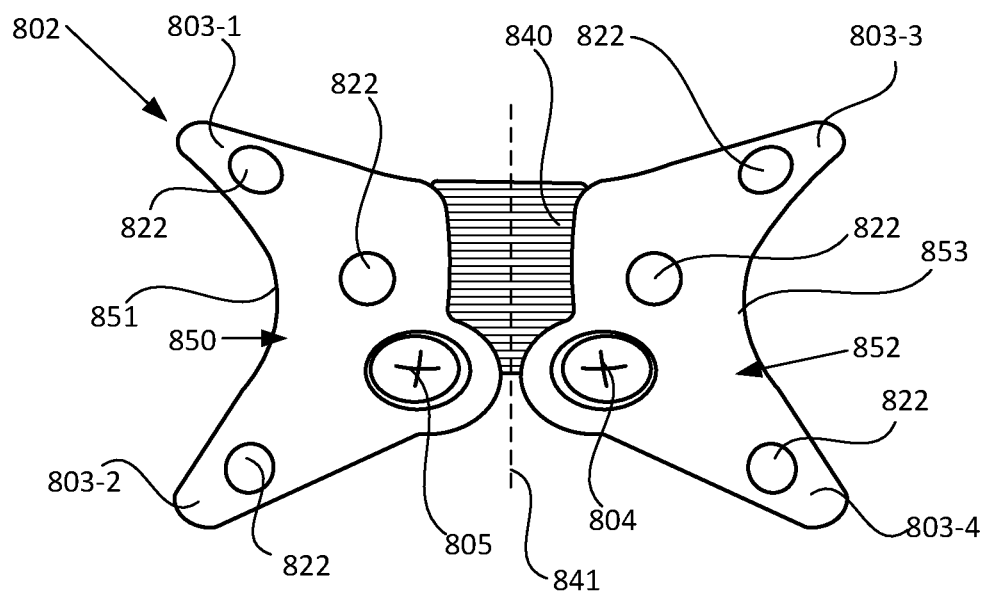
FIG. 8A illustrates an anchor plate according to an aspect.
Figure 8B:
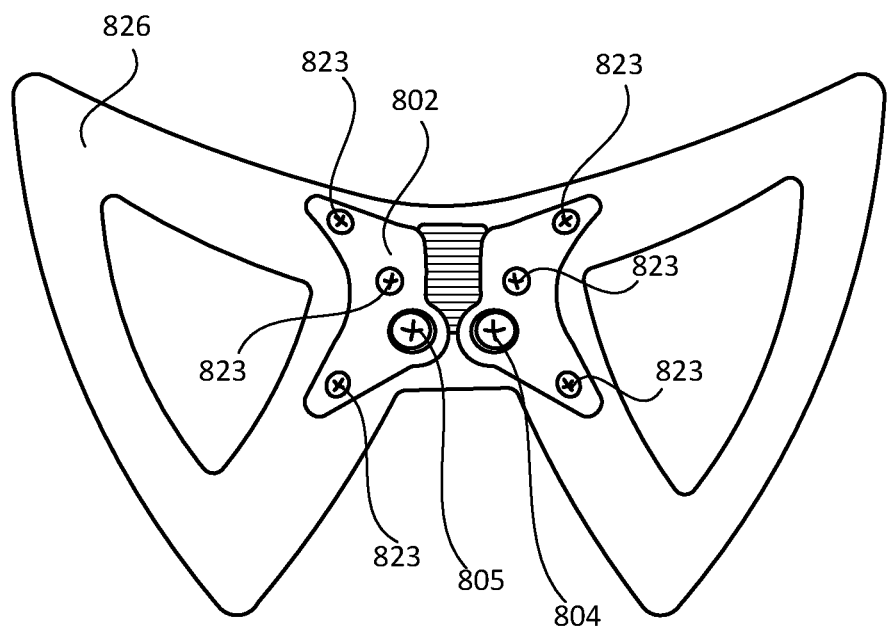
FIG. 8B illustrates the anchor plate coupled to a pelvic bone according to an aspect.

FIG. 8A illustrates an anchor plate 802 according to an aspect. FIG. 8B illustrates the anchor plate 802 coupled to a pelvic bone 826 using fastening members 823 (e.g., bone screws) according to aspect.

The anchor plate 802 may include a central portion 840, a first side portion 850 that extends from the central portion 840 on one side of the central portion 840, and a second side portion 852 that extends from the central portion 840 on the other side of the central portion 840. The anchor plate 802 defines a central axis 841 that splits the anchor plate 802 into two halves. In some examples, one half is substantially the same (or identical) to the other half.

The central portion 840 may include a flexible material that is more flexible than portions of the first side portion 850 and the second side portion 852. In some examples, the first side portion 850 is a first wing (e.g., one half of a butterfly shape), the second side portion 852 is a second wing (e.g., the other half of a butterfly shape), and the central portion 840 is disposed between the first wing and the second wing. In some examples, the first side portion 850 is substantially similar (or identical) to the second side portion 852.

The first side portion 850 defines a second attachment interface 805 that is configured to be coupled to a first cylinder member of a penile prosthesis, and the second side portion 852 defines a first attachment interface 804 that is configured to be coupled to a second cylinder member of the penile prosthesis.

The first side portion 850 defines a first corner portion 803-1 of the anchor plate 802 and a second corner portion 803-2 of the anchor plate 802. In some examples, the first corner portion 803-1 and the second corner portion 803-2 is rounded. In some examples, the first corner portion 803-1 and the second corner portion 803-2 are more flexible than non-corner areas of the first side portion 850. In some examples, the first corner portion 803-1 is a first arm portion that defines a central axis that is disposed at a non-zero (non-perpendicular) angle with respect to the central axis 841. In some examples, the second corner portion 803-2 is a second arm portion that defines a central axis that is disposed at a non-zero (non-perpendicular) angle with respect to the central axis 841. The first side portion 850 defines a concave portion 851 that extends between the first corner portion 803-1 and the second corner portion 803-2.

The first side portion 850 defines one or more anchoring holes 822 that are used to couple the anchor plate 802 to the pelvic bone 826. In some examples, the first side portion 850 defines three anchoring holes 822. In some examples, the first corner portion 803-1 defines an anchoring hole 822, and the second corner portion 803-2 defines an anchoring hole 822. In some examples, the first side portion 850 defines another anchoring hole 822 that is located more proximate to the second attachment interface 805.

The second side portion 852 defines a third corner portion 803-3 of the anchor plate 802 and a fourth corner portion 803-4 of the anchor plate 802. In some examples, the third corner portion 803-3 and the fourth corner portion 803-4 is rounded. In some examples, the third corner portion 803-3 and the fourth corner portion 803-4 are more flexible than non-corner areas of the second side portion 852. In some examples, the third corner portion 803-3 is a third arm portion that defines a central axis that is disposed at a non-zero (non-perpendicular) angle with respect to the central axis 841. In some examples, the fourth corner portion 803-4 is a second arm portion that defines a central axis that is disposed at a non-zero (non-perpendicular) angle with respect to the central axis 841. The second side portion 852 defines a concave portion 853 that extends between the third corner portion 803-3 and the fourth corner portion 803-4.

The second side portion 852 defines one or more anchoring holes 822 that are used to couple the anchor plate 802 to the pelvic bone 826. In some examples, the second side portion 852 defines three anchoring holes 822. In some examples, the third corner portion 803-3 defines an anchoring hole 822, and the fourth corner portion 803-4 defines an anchoring hole 822. In some examples, the second side portion 852 defines another anchoring hole 822 that is located more proximate to the first attachment interface 804.

Figure 9:
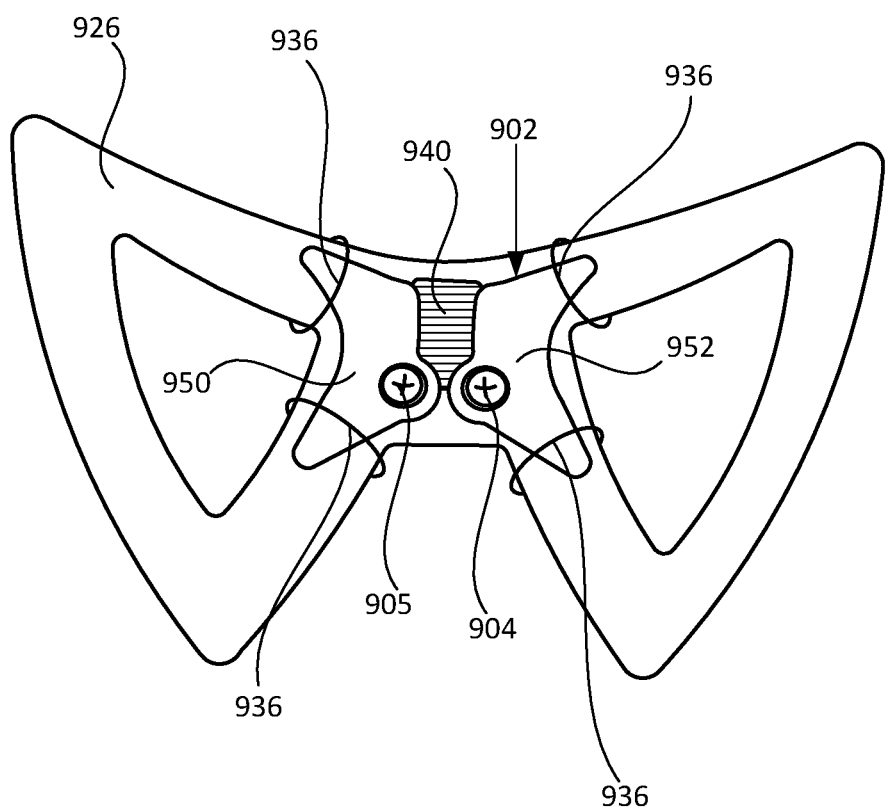
FIG. 9 illustrates an anchor plate coupled to a pelvic bone according to an aspect.

FIG. 9 illustrates an anchor plate 902 coupled to a pelvic bone 926 according to an aspect. The anchor plate 902 may be similar to the anchor plate 802 of FIGS. 8A and 8B except that the anchor plate 902 is not coupled to the pelvic bone 926 using fastening members (e.g., bone screws), and, therefore, the anchor plate 902 does not include anchoring holes. In some examples, when using an anchoring mechanism other than bone screws, the anchor plate 902 may include one or more holes (or another attachment feature such as ridge(s) or groove(s) that hold the suture in place) for which the suture/mesh arms can pass through to secure the anchor plate 902. For example, the anchor plate 902 defines a first attachment interface 904 and a second attachment interface 905, each of which is configured to be coupled to a cylinder member of a penile prosthesis. Similar to FIGS. 8A and 8B, the anchor plate 902 may include a central portion 940, a first side portion 950, and a second side portion 952. The anchor plate 902 may include any of the features described with reference to the anchor plate 802 of FIGS. 8A and 8B (as well as the features described with reference to the previous figures). The anchor plate 902 is coupled to the pelvic bone 926 using thread members 936 (e.g., sutures/wires). For example, a separate thread member 936 is disposed over each corner portion of the anchor plate 902 and wrapped over a respective portion of the pelvic bone 926.

Figure 10A:
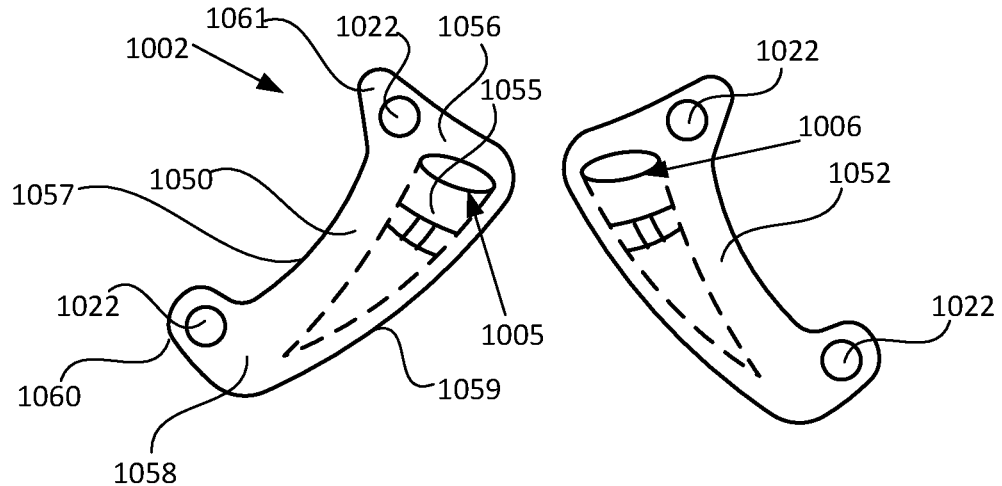
FIG. 10A illustrates an anchor plate according to an aspect.
Figure 10B:
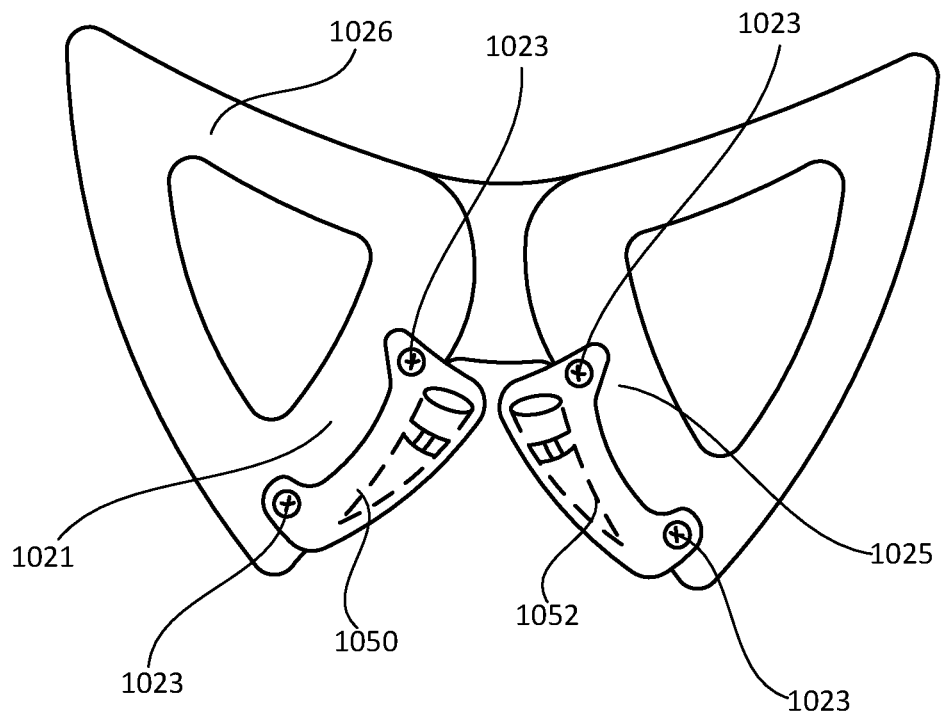
FIG. 10B illustrates the anchor plate coupled to a pelvic bone according to an aspect.

FIG. 10A illustrates an anchor plate 1002 according to an aspect. FIG. 10B illustrates the anchor plate 1002 coupled to a pelvic bone 1026 according to an aspect. The anchor plate 1002 may include a first anchor member 1050 and a second anchor member 1052 that is separate and distinct from the first anchor member 1050. The first anchor member 1050 may be coupled to a portion 1021 of the pelvic bone 1026 using fastening members 1023 (e.g., bone screws), and the second anchor member 1052 may be coupled to a portion 1025 of the pelvic bone 1026 using fastening members 1023 (e.g., bone screws). The first anchor member 1050 defines a first attachment interface 1005 configured to be coupled to a first cylinder of a penile prosthesis. The second anchor member 1052 defines a second attachment interface 1006 configured to be coupled to a second cylinder of a penile prosthesis. Each of the first attachment interface 1005 and the second attachment interface 1006 defines a cylindrical cavity 1055 that is configured to receive a proximal end portion (e.g., a rear-tip) of a respective cylinder of the penile prosthesis. In some examples, the cylindrical cavity 1055 has a tapered shape that corresponds to a shape of the proximal end portion of a respective cylinder.

The first anchor member 1050 includes a first end portion 1056 and a second end portion 1058. The first anchor member 1050 includes a first side portion 1057 that extends between the first end portion 1056 and the second end portion 1058, and a second side portion 1059 (disposed oppose to the first side portion 1057) that extends between the first end portion 1056 and the second end portion 1058. In some examples, the first side portion 1057 is curved. In some examples, the second side portion 1059 is curved. In some examples, the first end portion 1056 includes an extended portion 1061 that extends laterally from the first side portion 1057. In some examples, the second end portion 1058 includes an extended portion 1060 that extends laterally from the first side portion 1057.

The first anchor member 1050 defines one or more anchoring holes 1022 configured to receive fastening members 1023 to couple to the portion 1021 of the pelvic bone 1026. In some examples, the first anchor member 1050 defines two anchoring holes 1022. In some examples, the extended portion 1061 defines an anchoring hole 1022, and the extended portion 1060 defines an anchoring hole 1022. An opening to the cylindrical cavity 1055 is disposed proximate to the first end portion 1056 and extends towards the second end portion 1058. In some examples, the size of the cylindrical cavity 1055 becomes smaller towards the second end portion 1058. In some examples, the cylindrical cavity 1055 has a cone shape. Since the second anchor member 1052 includes the same features as the first anchor member 1050, a detailed description of this component is omitted for the sake of brevity.

Figure 11A:
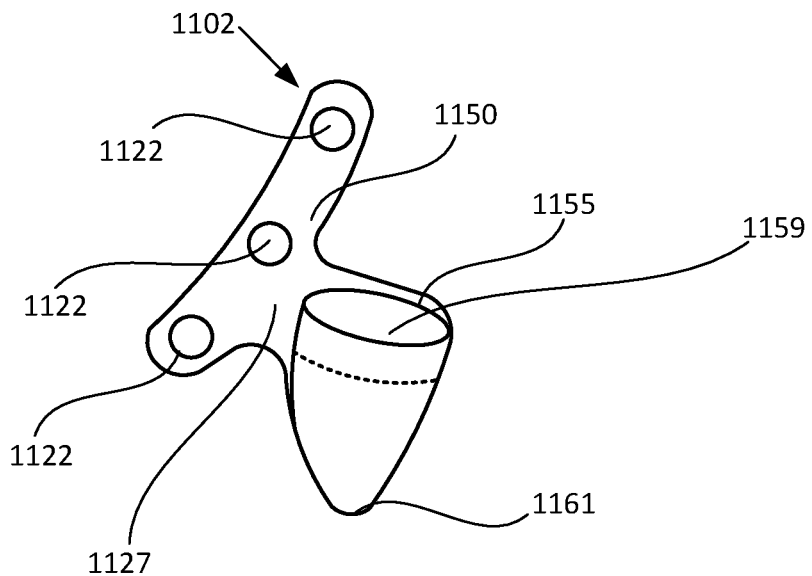
FIG. 11A illustrates an anchor plate according to an aspect.
Figure 11B:
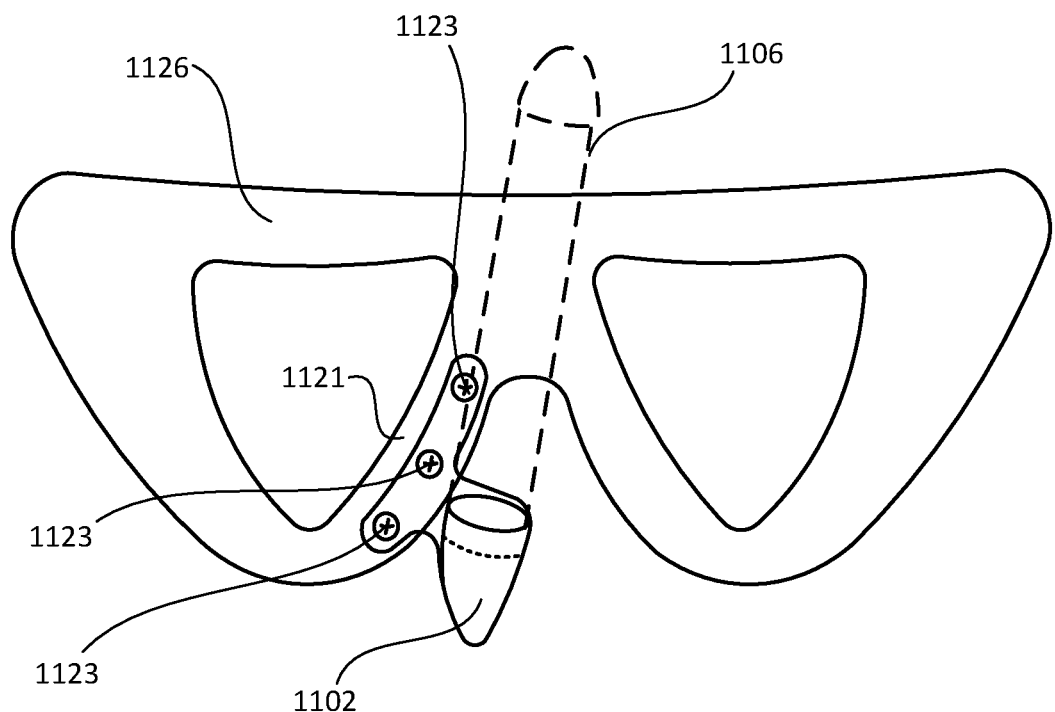
FIG. 11B illustrates the anchor plate coupled to a pelvic bone according to an aspect.

FIG. 11A illustrates an anchor plate 1102 according to an aspect. FIG. 11B illustrates the anchor plate 1102 coupled to a portion 1121 of a pelvic bone 1126 according to an aspect. The anchor plate 1102 includes an anchoring member 1150 that defines anchoring holes 1122 that are used to anchor the anchoring member 1150 to the portion 1121 of the pelvic bone 1126 using fastening members 1123 (e.g., bone screws), as shown in FIG. 11B. In some examples, the anchoring member 1150 is an elongated body that is substantially linear (or has a slight curvature). The anchoring holes 1122 may be spaced apart from each along an axis.

The anchor plate 1102 includes an implant insert 1155 that extends from a side portion 1127 of the anchoring member 1150. The implant insert 1155 defines an opening 1159 on one end of the implant insert 1155 and a closed end 1161 on the other end of the implant insert 1155. The implant insert 1155 has a lumen (e.g., a cylindrical lumen) that extends from the opening 1159 to the closed end 1161. In some examples, the lumen is tapered. The opening 1159 receives a proximal end portion of a penile implant 1106 such that the proximal end portion of the penile implant 1106 is disposed within the implant insert 1155.

Figure 12A:
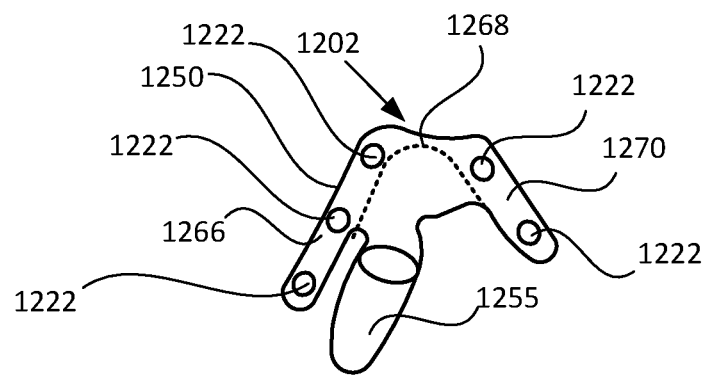
FIG. 12A illustrates an anchor plate according to an aspect.
Figure 12B:
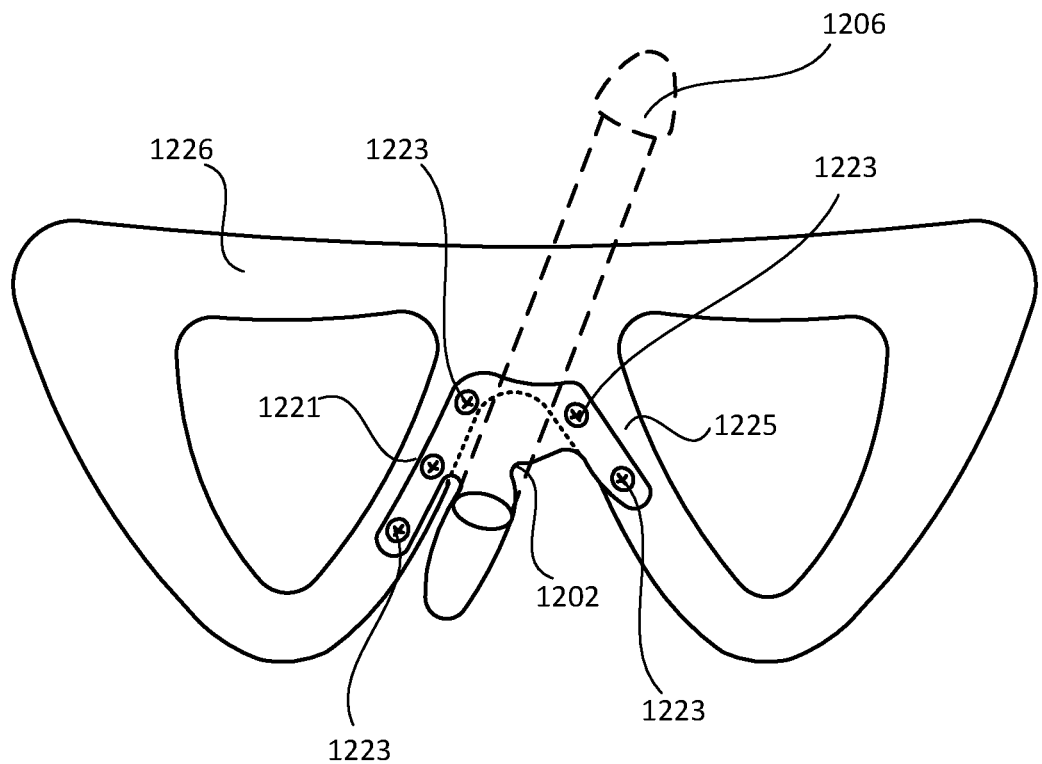
FIG. 12B illustrates the anchor plate coupled to a pelvic bone according to an aspect.

FIG. 12A illustrates an anchor plate 1202 according to an aspect. FIG. 12B illustrates the anchor plate 1202 coupled to a portion 1221 of a pelvic bone 1226 and to a portion 1225 of the pelvic bone 1226. The anchor plate 1202 includes an anchoring member 1250 and an implant insert 1155. The implant insert 1255 may be the same/similar to the implant insert 1155 of FIGS. 11A and 11B. For example, the implant insert 1255 may receive a proximal end portion of a penile implant 1206, as shown in FIG. 12B.

The anchoring member 1250 may include a first portion 1266, a connecting portion 1268, and a second portion 1270. The connecting portion 1268 connects the first portion 1266 and the second portion 1270. The first portion 1266 is the same/similar to the anchoring member 1150 of FIGS. 11A and 11B. The first portion 1266 defines anchoring holes 1222 (e.g., three anchoring holes 1222). The first portion 1266 may be connected to the portion 1221 of the pelvic bone 1226 using fastening members 1223 (e.g., bone screws) that are inserted into the anchoring holes 1222 and into the pelvic bone 1226. The second portion 1270 defines anchoring holes 1222 (e.g., two anchoring holes 1222). The second portion 1270 may be connected to the portion 1221 of the pelvic bone 1226 using fastening members 1223 (e.g., bone screws) that are inserted into the anchoring holes 1222 and into the pelvic bone 1226.

Figure 13A:
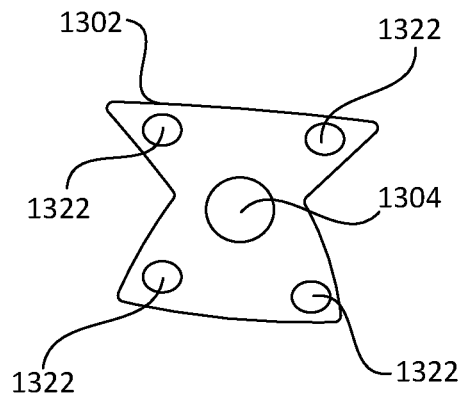
FIG. 13A illustrates an anchor plate according to an aspect.
Figure 13B:
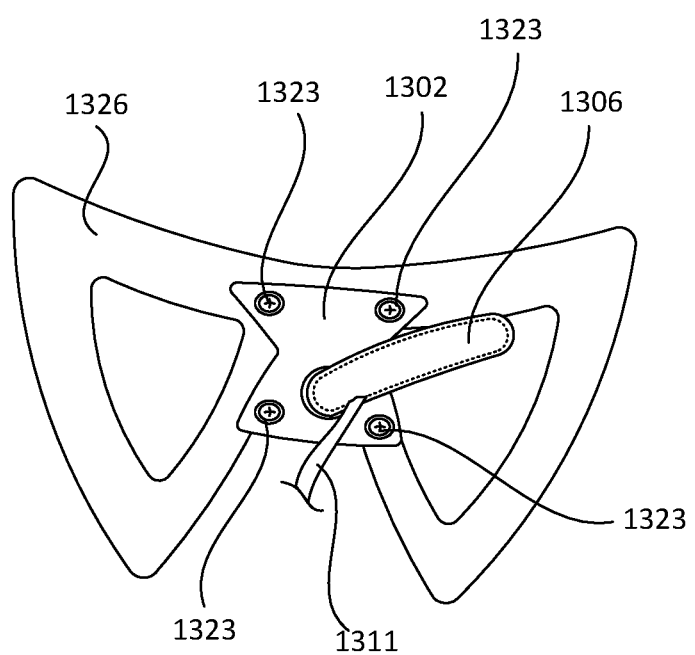
FIG. 13B illustrates the anchor plate coupled to a pelvic bone and an adjustable member coupled to the anchor plate according to an aspect.

FIG. 13A illustrates an anchor plate 1302 according to an aspect. FIG. 13B illustrates the anchor plate 1302 coupled to a pelvic bone 1326, and an adjustable member 1306 coupled to the anchor plate 1302. The adjustable member 1306 is configured to increase in diameter/length over a period of time in order to create a neophallus capsule. In some examples, the adjustable member 1306 is configured to increase in size over time upon the injection of fluid into the adjustable member 1306 via a fluid port 1311. However, the adjustable member 1306 may increase in size according to other methods as discussed herein.

In some examples, the anchor plate 1302 and the adjustable member 1306 are used in a multi-stage implantation method. For example, the multi-stage implantation method may provide a minimally invasive approach that allows the patient tissue to naturally model over time to create the neophallus capsule without having to endure multiple extremely invasive high risk grafting and cosmetic surgeries.

The anchor plate 1302 is secured to the patient's pelvic and provides a foundation for the adjustable member 1306. The adjustable member 1306 is the component that provides the forces which act on the tissue to promote tissue remodeling. The adjustable member 1306 is slowly expanded over time to expand the patient's tissue into the desired shape of a neophallus capsule. To achieve the desired neophallus size, a series of adjustments in combination with one or more adjustable member change-outs may be beneficial or required. The adjustable member 1306 may be regulated by the physician or the patient but is dependent on the design and the pain tolerance of the patient. This approach may be tailored to the patient, allowing them to adjust periodically to accommodate the patient's tissue growth and modification to minimize patient discomfort. The tissue may be modified over the course of a period of time (e.g., months, year, multiple years, etc.), dependent on the tissue, patient, and desired neophallus shape and size. Once the desired neophallus size is created, the adjustable member 1306 may be used as the final penile prosthesis or may be replaced by a specific neophallus implant or a penile prosthesis.

In some examples, the method and components described herein may cause a reduction in infection and complication compared to general surgery, provide a neophallus blood supply (e.g., thereby avoiding the need for anastomosis/microsurgery), provide a natural look (e.g., no highly visible scarring on the forearms or buttock or leg), reduce or eliminate invasive skin flap/tissue transfer/grafting, and/or provide a less invasive procedure (overall). In addition, the method and components described herein may provide a tailorable procedure to the patient anatomy, patient pain tolerance, age, and potentially patient unable to endure the stress of grafting and back to back surgeries. In some examples, the method and components described herein may provide psychological improvement and improved gratification (e.g., patient observes incremental changes immediately, keeps them motivated, less traumatic than full phalloplasty surgery), reduction in patient overall healing time, and reduces the need of a team of specialized plastic and urologic surgeons to complete the procedure, as well as a creation of a neophallus independent of the urethra, which can minimize concomitant urethral complications. In some examples, the urethra is added at a later stage.

The anchor plate 1302 provides a base for the adjustable member 1306 to connect to the patent's pelvic. In some examples, the placement location and angle can be adjusted or determined by the surgeon to fit the patient's anatomy and desired take-off angle of the adjustable member 1306 (or future penile prosthesis). In some examples, the anchor plate 1302 is used for the final implant. In some examples, the anchor plate 1302 is not used for the final implant.

In some examples, the anchor plate 1302 includes a metal structure such as stainless steel and/or titanium. In some examples, the anchor plate 1302 includes an implantable engineered plastic material. In some examples, the anchor plate 1302 may be any of the previously described anchor plates. The anchor plate 1302 may be attached to a pelvic bone 1326 with bone screws, suture, mesh, hoots, bone adhesive, and/or bone epoxy. In some examples, as shown in FIGS. 13A and 13B, the anchor plate 1302 defines anchoring holes 1322 in which bone screws 1323 can be screwed into (e.g., from front of the pelvic bone 1326 or the back of the pelvic bone 1326). In addition, the anchor plate 1302 defines an attachment interface 1304 for connecting to the adjustable member 1306. The attachment interface 1304 may be a ball and socket interface. For example, the attachment interface 1304 may define an opening (e.g., a socket), and the proximal end portion of the adjustable member 1306 may include a rear-tip extender that is configured to extend through the opening and hold the adjustable member 1306 in place.

The adjustable member 1306 is attached to the anchor plate 1302 to allow for incremental adjustment. The adjustable member 1306 applies the force and defines the neophallus capsule. The incremental adjustment may be performed either by the patient or physician tailored to accommodate the pain threshold of the patient. In some examples, the adjustable member 1306 is an interim implant utilized to create the neophallus capsule. Once an acceptable cavity (e.g., length/girth) has been achieved through periodic adjustments and change-outs, the final implant may be placed into the neophallus capsule. In some examples, the use of the adjustable member 1306 is less invasive than grafts/tissue harvesting and dependent on the pain threshold of the patient, which could potentially shorten total neophallus construction duration and op and post op visit frequency.

Figure 14A:
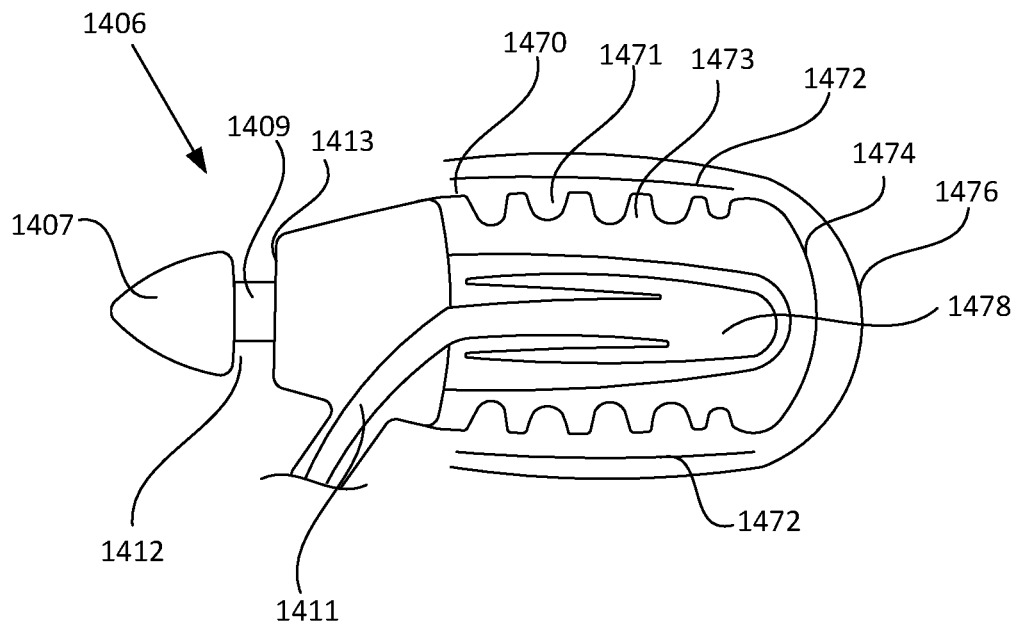
FIG. 14A illustrates an adjustable member in a non-expanded state according to an aspect.
Figure 14B:
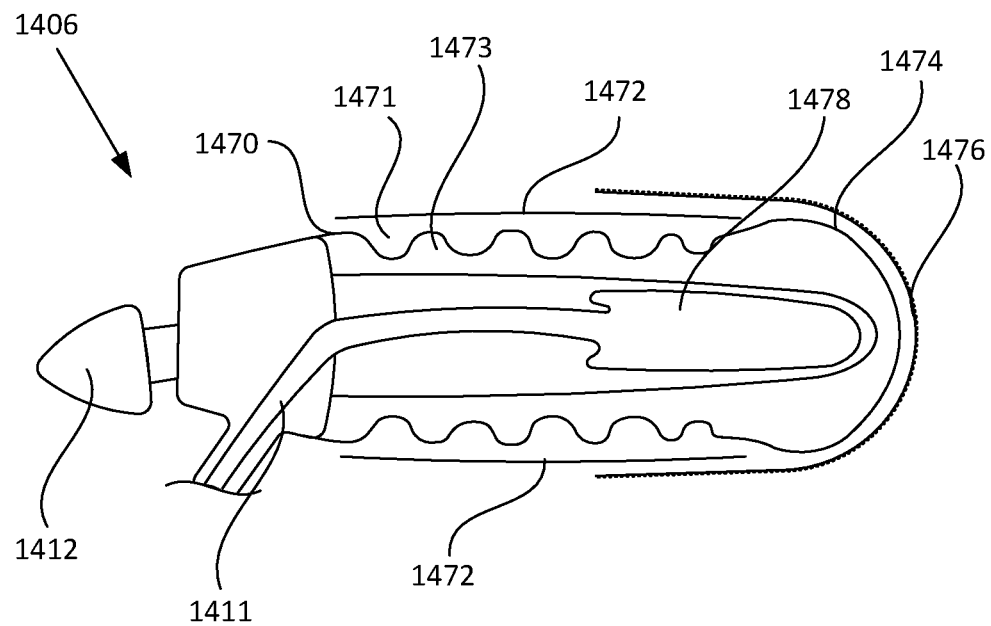
FIG. 14B illustrates an adjustable member in an expanded state according to an aspect.

FIG. 14A illustrates an adjustable member 1406 in a non-expanded state according to an aspect. FIG. 14B illustrates the adjustable member 1406 in an expanded state according to an aspect. In some examples, the adjustable member 1406 is a cylinder with an integrated balloon design that increases in length as pressure applied by an internal expandable member 1478 to the replicated cylinder. The internal volume/pressure may be supplied from an external source or an integrated implanted pump (e.g., hydraulic or pneumatic) (not shown in FIGS. 14A and 14B) through a transfer channel 1411.

The adjustable member 1406 includes an elastomer housing 1470 that includes the internal expandable member 1478. In some examples, the elastomer housing 1470 has a cylindrical shape with an internal cavity (e.g., a fully enclosed cavity) that includes the internal expandable member 1478. In some examples, the internal expandable member 1478 includes an elastic membrane capable of expanding and contracting. In some examples, the internal expandable member 1478 includes a balloon.

The elastomer housing 1470 may include a round portion 1474 (e.g., a glans feature) on a distal end of the elastomer housing 1470. The internal expandable member 1478 defines a cavity that receives fluid or air via the transfer channel 1411 that connects to an external source or implanted pump or connects to an internal source such as a fluid injection port beneath the skin. For example, the transfer channel 1411 is in fluid communication with the internal expandable member 1478 and extends to a location outside of the elastomer housing 1470. Upon the injection of fluid or air into the internal expandable member 1478, the internal expandable member 1478 expands, thereby increasing the size (e.g., length, diameter) of the elastomer housing 1470. The elastomer housing 1470 may define surface features such as grooves 1471 and ridges 1473 that allows the elastomer housing 1470 to extend longitudinally and radially from the pressure provided by the internal expandable member 1478.

The adjustable member 1406 includes a rear-tip adaptor 1412 configured to connect to the attachment interface 1304 of the anchor plate 1302 of FIGS. 13A and 13B. For example, the rear-tip adaptor 1412 is configured to snap-fit into the attachment interface 1304 of the anchor plate 1302. In some examples, the adjustable member 1406 may include any of the previous attachment interfaces (besides the snap-fit connection interface). In some examples, the attachment interface 1304 defines an opening. Moving in the proximal direction, a distal tip 1407 of the rear-tip adaptor 1412 is configured to squeeze through the opening such that a reduced portion 1409 is disposed in the opening, and the anchor plate 1302 is disposed between the distal tip 1407 and a proximal end portion 1413 of the elastomer housing 1470. The attachment of the adjustable member 1406 to the anchor plate 1302 in this manner may allow for orbital movement of the adjustable member 1406.

The adjustable member 1406 may include or operate in conjunction with a glans cap member 1476 and a neophallus ring 1472. In some examples, As shown in FIG. 14B, the glans cap member 1476 is textured to reduce (or prevent) erosion during adjustment. The glans cap member 1476 and the neophallus ring 1472 may be utilized in conjunction with the adjustable member 1406 to supply a scaffold for tissue modeling and neophallus capsule formation. In some examples, the glans cap member 1476 and/or the neophallus ring 1472 may include textured yarns or mesh designed for controlled length/girth expansion. In some examples, the glans cap member 1476 and/or the neophallus ring 1472 may include a compound textile assembly structure including polyethylene terephthalate (PET). In some examples, the glans cap member 1476 and/or the neophallus ring 1472 may include a randomized fabric structure replicating localized tissue having similar expansion/elongation properties (e.g., bladder, obturator membrane). In some examples, the glans cap member 1476 and/or the neophallus ring 1472 may include a pre-formed open cell foam matrix for tissue ingrowth, which may promote a thicker capsule wall. In some examples, the glans cap member 1476 and/or the neophallus ring 1472 may include additional neophallus capsule rings, which could be added during each change-out of adjustable member to accommodate the change in length.

Figure 15A:
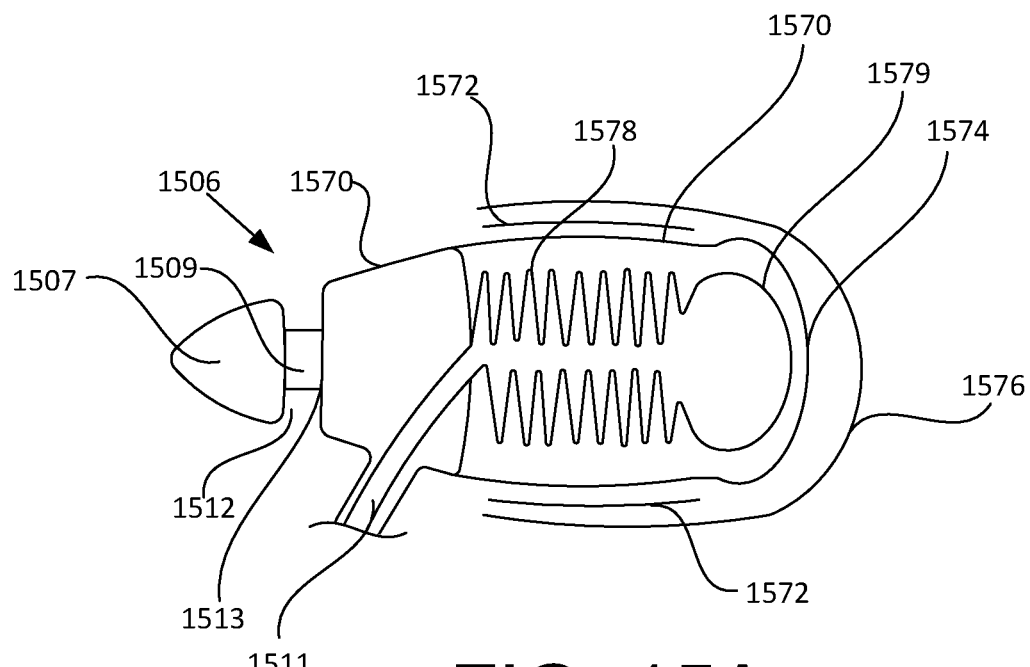
FIG. 15A illustrates an adjustable member in a non-expanded state according to an aspect.
Figure 15B:
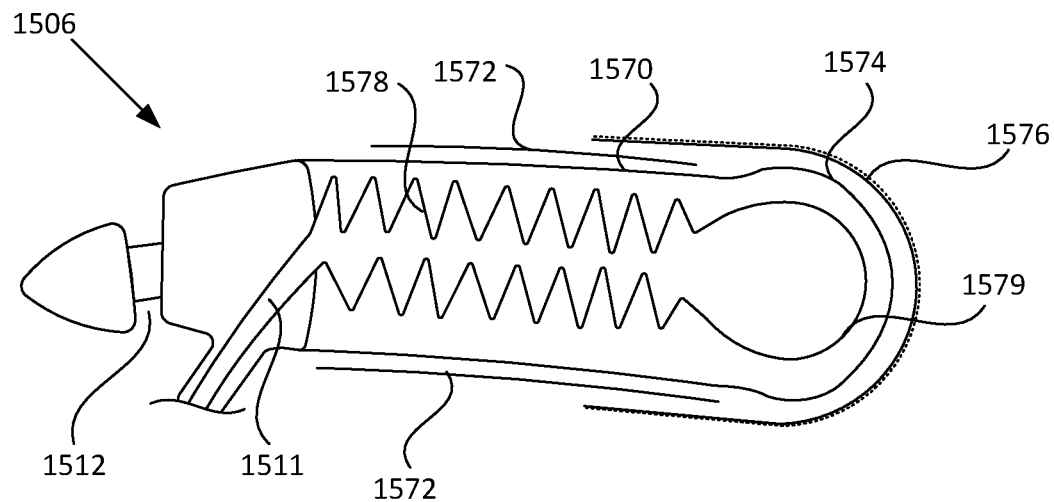
FIG. 15B illustrates an adjustable member in an expanded state according to an aspect.

FIG. 15A illustrates an adjustable member 1506 in a non-expanded state according to an aspect. FIG. 15B illustrates the adjustable member 1506 in an expanded state according to an aspect. In some examples, the adjustable member 1506 is a single adjustable member to expand to a length dependent on the volume of fluid added during incremental adjustments. The internal volume/pressure may be supplied from an external source or an integrated implanted pump (e.g., hydraulic or pneumatic) (not shown in FIGS. 15A and 15B) through a transfer channel 1511.

The adjustable member 1506 includes an elastomer housing 1570 that includes a bellow structure 1578 with a rounded distal end 1579. The elastomer housing 1570 may include a round portion 1574 (e.g., a glans feature) on a distal end of the elastomer housing 1570. In some examples, the elastomer housing 1570 has a cylindrical shape with an internal cavity (e.g., a fully enclosed cavity) that includes the bellow structure 1578 and the rounded distal end 1579. As shown in FIG. 15B, the bellow structure 1578 is configured to longitudinally expand upon the introduction of air/fluid via the transfer channel 1511 such that the rounded distal end 1579 pushes the elastomer housing 1570 in the distal direction.

The adjustable member 1506 includes a rear-tip adaptor 1512 configured to connect to the attachment interface 1304 of the anchor plate 1302 of FIGS. 13A and 13B. For example, the rear-tip adaptor 1512 is configured to snap-fit into the attachment interface 1304 of the anchor plate 1302. In some examples, the attachment interface 1304 defines an opening. Moving in the proximal direction, a distal tip 1507 of the rear-tip adaptor 1512 is configured to squeeze through the opening such that a reduced portion 1509 is disposed in the opening, and the anchor plate 1302 is disposed between the distal tip 1507 and a proximal end portion 1513 of the elastomer housing 1570. The attachment of the adjustable member 1506 to the anchor plate 1302 in this manner may allow for orbital movement of the adjustable member 1506.

The adjustable member 1506 may include or operate in conjunction with a glans cap member 1576 and a neophallus ring 1572. In some examples, as shown in FIG. 15B, the glans cap member 1576 is textured to reduce (or prevent) erosion during adjustment. The glans cap member 1576 and the neophallus ring 1572 may be utilized in conjunction with the adjustable member 1506 to supply a scaffold for tissue modeling and neophallus capsule formation. The glans cap member 1576 and/or the neophallus ring 1572 may include any of the features described with reference to FIGS. 14A-14B.

Figure 16A:
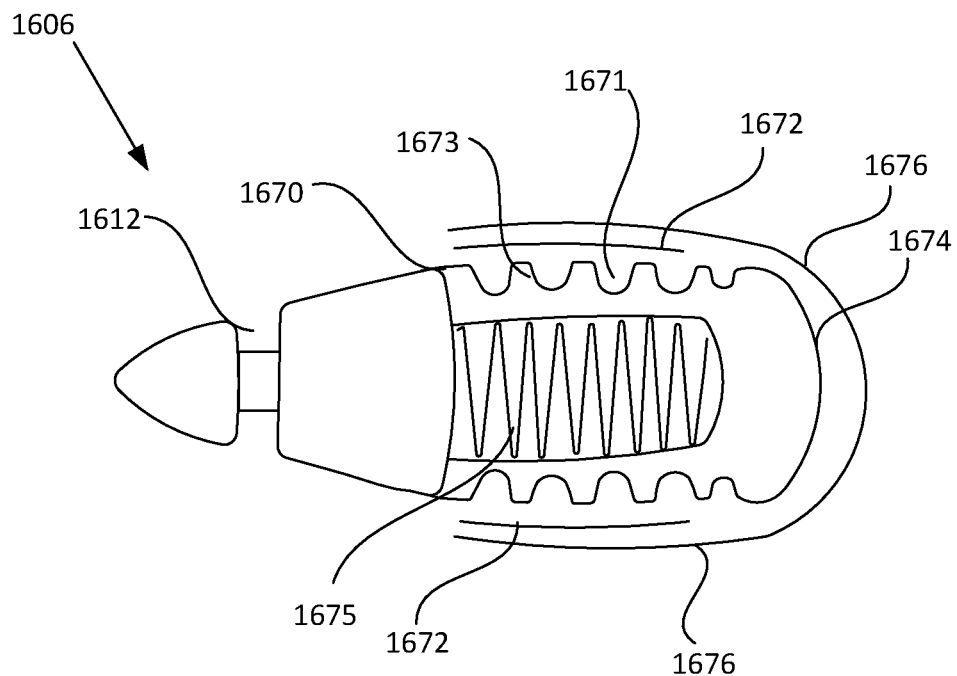
FIG. 16A illustrates an adjustable member in a non-expanded state according to an aspect.
Figure 16B:
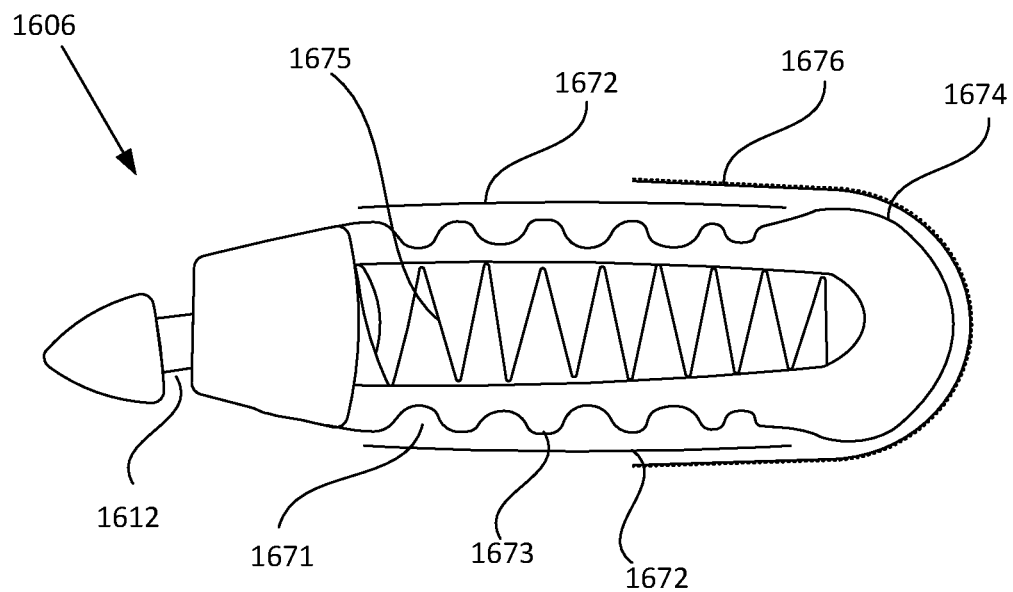
FIG. 16B illustrates an adjustable member in an expanded state according to an aspect.

FIG. 16A illustrates an adjustable member 1606 in a non-expanded state according to an aspect. FIG. 16B illustrates the adjustable member 1606 in an expanded state according to an aspect. In some examples, the adjustable member 1606 is inserted in a fully compressed state and by constantly applying pressure to the surrounding tissue, the adjustable member 1606 drives tissues remodeling and neophallus capsule formation. In some examples, when the fully expanded spring height is reached, the adjustable member 1606 may be changed out for the next incremental size.

The adjustable member 1606 includes an elastomer housing 1670 with ridges 1673 and expandable grooves 1671. The elastomer housing 1670 includes a round portion 1674 (e.g., a glans feature) on a distal end of the elastomer housing 1670. In some examples, the elastomer housing 1670 has a cylindrical shape with an internal cavity (e.g., a fully enclosed cavity) that includes a spring member 1675. In some examples, the spring member 1675 includes a coil over a spring. In the compressed state of FIG. 16A, the spring member 1675 in the compressed state causes the elastomer housing 1670 to apply a force on the surrounding tissue. After a period of time has elapsed, the adjustable member 1606 may be in the expanded state as shown in FIG. 16B.

The adjustable member 1606 includes a rear-tip adaptor 1612 configured to connect to the attachment interface 1304 of the anchor plate 1302 of FIGS. 13A and 13B. For example, the rear-tip adaptor 1612 is configured to snap-fit into the attachment interface 1304 of the anchor plate 1302.

The adjustable member 1606 may include or operate in conjunction with a glans cap member 1676 and a neophallus ring 1672. In some examples, as shown in FIG. 16B, the glans cap member 1676 is textured to reduce (or prevent) erosion during adjustment. The glans cap member 1676 and the neophallus ring 1672 may be utilized in conjunction with the adjustable member 1606 to supply a scaffold for tissue modeling and neophallus capsule formation. The glans cap member 1676 and/or the neophallus ring 1672 may include any of the features described with reference to FIGS. 14A-14B.

Figure 17A:
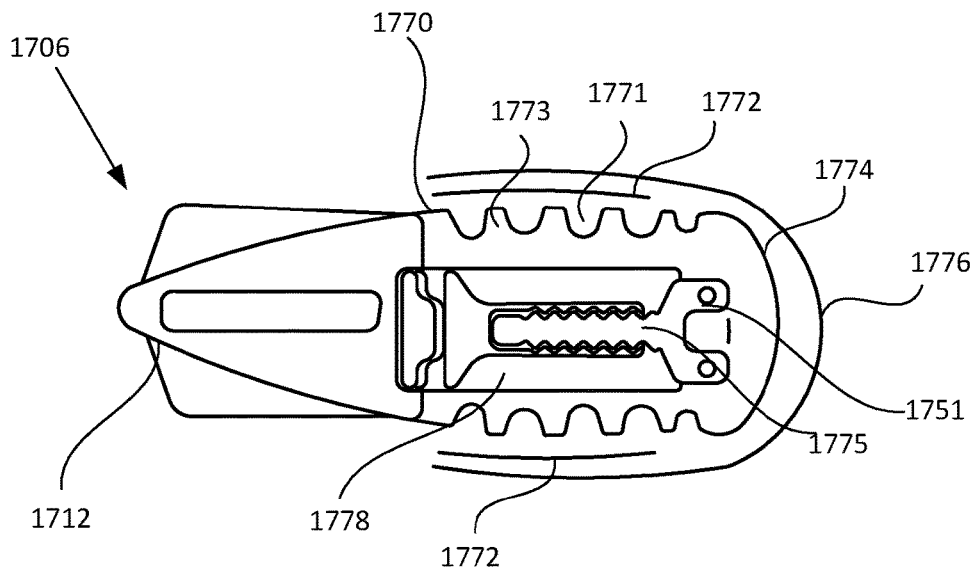
FIG. 17A illustrates an adjustable member in a non-expanded state according to an aspect.
Figures 17B, 17C:
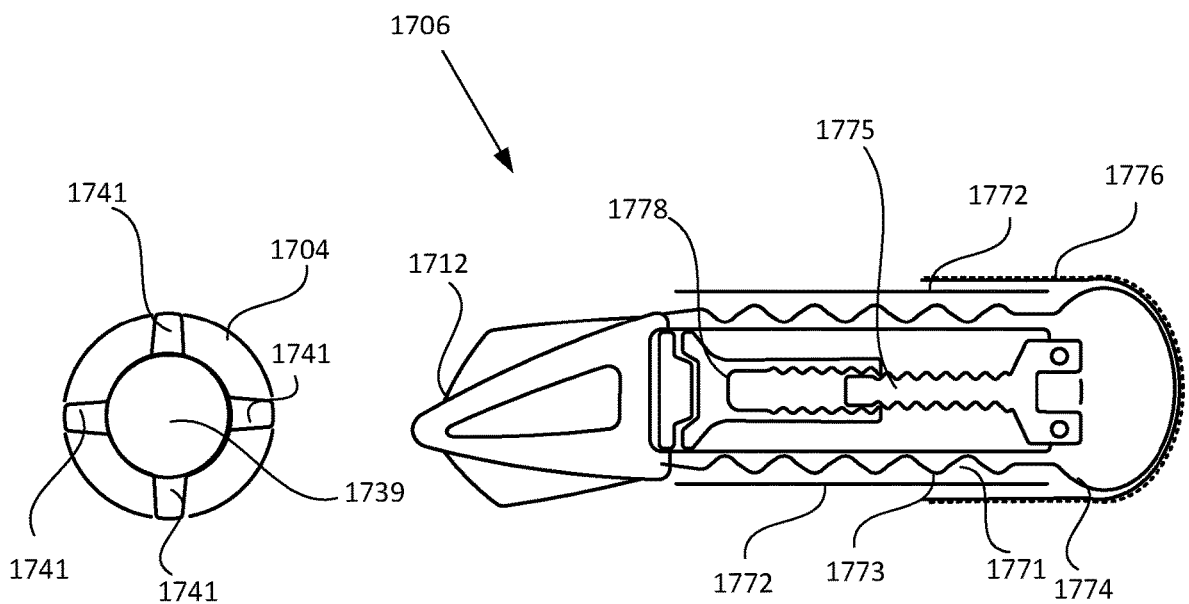
FIG. 17B illustrates an adjustable member in an expanded state according to an aspect.
FIG. 17C illustrates a cross-section of an anchor plate according to an aspect.

FIG. 17A illustrates an adjustable member 1706 in a non-expanded state according to an aspect. FIG. 17B illustrates the adjustable member 1706 in an expanded state according to an aspect. FIG. 17C illustrates an attachment interface 1704 of an anchor plate. The adjustable member 1706 includes a rear-tip adaptor 1712 configured to engage with the attachment interface 1704 in order to couple the adjustable member 1706 to the anchor plate and permit the operator to rotate the adjustable member 1706 with respect to the anchor plate.

In some examples, the adjustable member 1706 is adjusted periodically to apply pressure to the surrounding tissue, which forces localized tissue modeling. The adjustable member 1706 is configured to be rotated (e.g., by the patient or physician) by grabbing a portion of the adjustable member 1706 and ratcheting a jack screw 1775 in or out with respect to a jack screw insert 1778. For example, when the operator rotates the adjustable member 1706 in a first direction, the jack screw 1775 may longitudinally translate out of the jack screw insert 1778, thereby increasing the length of the adjustable member 1706. When the operator rotates the adjustable member 1706 in a second direction opposite to the first direction, the jack screw 1775 may longitudinally translate into the jack screw insert 1778, thereby decreasing the length of the adjustable member 1706.

The adjustable member 1706 includes an elastomer housing 1770 with ridges 1773 and expandable grooves 1771. The elastomer housing 1770 includes a round portion 1774 (e.g., a glans feature) on a distal end of the elastomer housing 1770. In some examples, the elastomer housing 1770 has a cylindrical shape with an internal cavity (e.g., a fully enclosed cavity) that includes the jack screw 1775 and the jack screw insert 1778. The jack screw 1775 includes a distal portion 1751 that is at least partially disposed in the round portion 1774. An operator may grab the round portion 1774 in order to rotate the adjustable member 1706.

The rear-tip adaptor 1712 is configured to connect to the attachment interface 1704. The attachment interface 1704 defines an opening 1739 in a central region of the attachment interface 1704, and the opening 1739 is configured to receive a portion of the rear-tip adaptor 1712. Also, the attachment interface 1704 defines a plurality of slots 1741 that engage with portions of the rear-tip adaptor 1712 in order to prevent the rear-tip adaptor 1712 from rotating when the elastomer housing 1770 is rotated to increase (or decrease) the length of the adjustable member 1706.

The adjustable member 1706 may include or operate in conjunction with a glans cap member 1776 and a neophallus ring 1772. In some examples, as shown in FIG. 17B, the glans cap member 1776 is textured to reduce (or prevent) erosion during adjustment. In some examples, the glans cap member 1776 may include a softer material to provide load dampering and reduce the pressure applied on the neophallus tissue at the front tip which can reduce (or prevent) erosions. In some examples, the glans cap member 1776 may have a shape to create a structure to the glans of the neophallus. The glans cap member 1776 and the neophallus ring 1772 may be utilized in conjunction with the adjustable member 1706 to supply a scaffold for tissue modeling and neophallus capsule formation. The glans cap member 1776 and/or the neophallus ring 1772 may include any of the features described with reference to FIGS. 14A-14B.

Figure 18A:
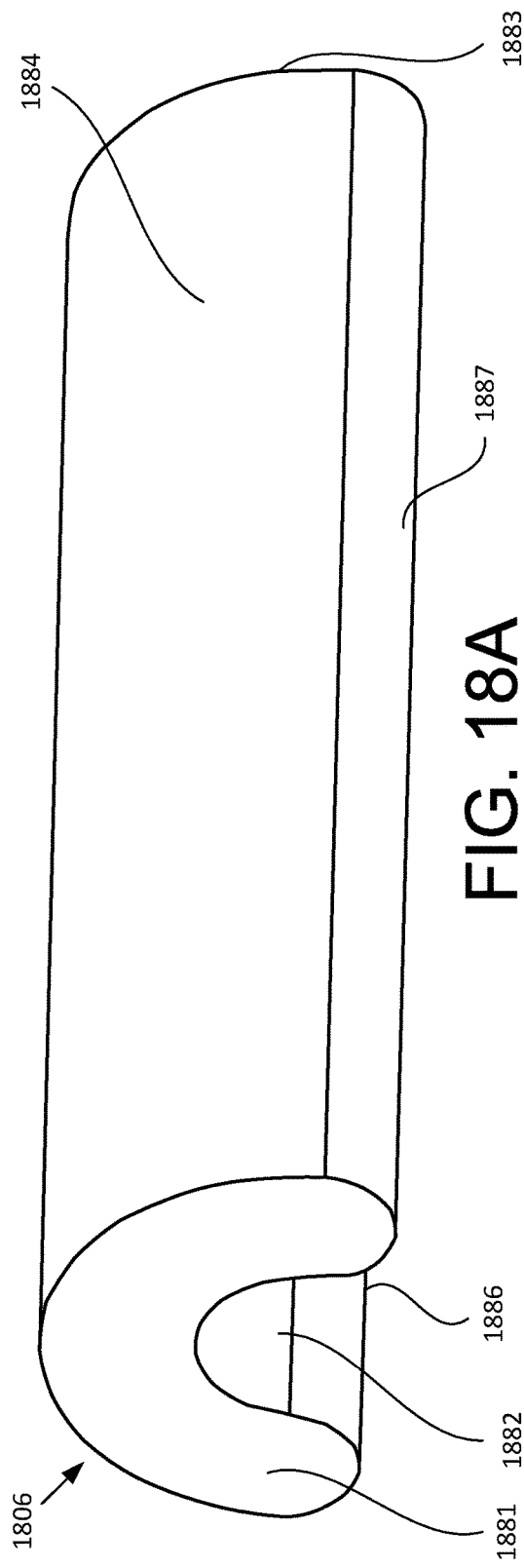
FIG. 18A illustrates a penile shaft according to an aspect.
Figure 18B:
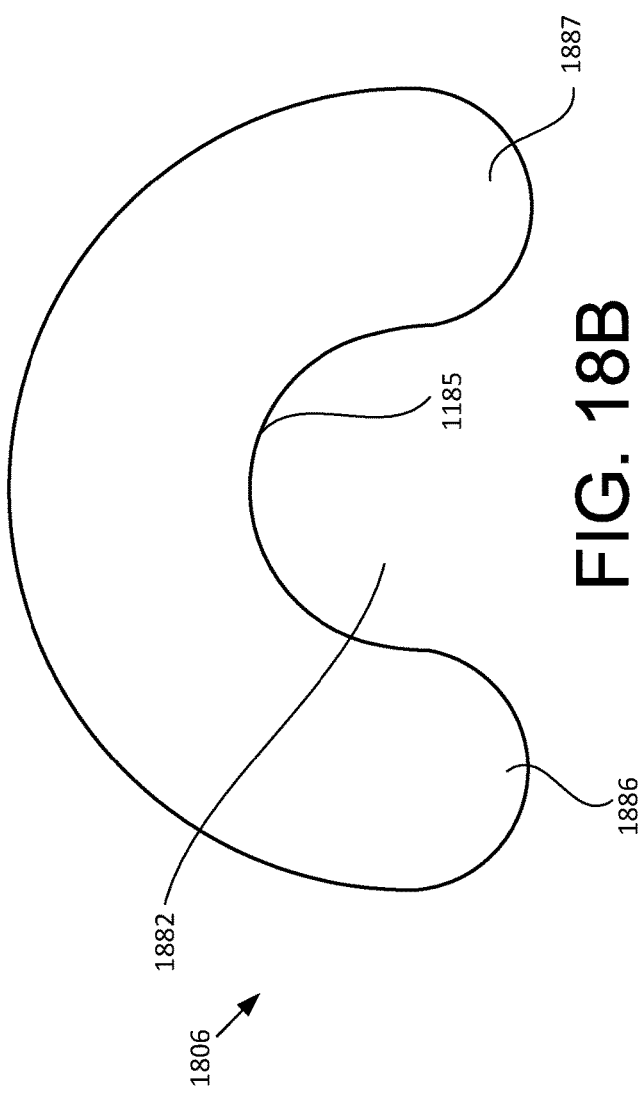
FIG. 18B illustrates a cross-section of the penile shaft according to an aspect.

FIG. 18A illustrates a penile prosthetic shaft 1806 according to an aspect. FIG. 18B illustrates a cross-section of the penile prosthetic shaft 1806 according to an aspect. The penile prosthetic shaft 1806 has a shape that accommodates the neourethra within the neophallus. For example, the penile prosthetic shaft 1806 may be inserted into the neophallus in a manner that accommodates a neourethra that is also disposed in the neophallus. In some examples, the penile prosthetic shaft 1806 may fill the open space of the neophallus cavity for improved aesthetics and tactile feel. In some examples, the penile prosthetic shaft 1806 may maximize the space of the neophallus to provide additional rigidity and stiffness and may support the structure of the neourethra.

The penile prosthetic shaft 1806 includes a proximal end portion 1881 and a distal end portion 1883. The distal end portion 1883 of the shaft may be a rounded front fit (e.g., similar to the glans feature described above). The penile prosthetic shaft 1806 includes an outer surface 1884 and an inner surface 1885. In some examples, the outer surface 1884 is curved. In some examples, the inner surface 1885 is curved. In some examples, the outer shape of the penile prosthetic shaft 1806 may be round or crescent to fill (e.g., maximally fill) the space of the neophallus to provide additional rigidity and stiffness and mimic a natural penis. In some examples, the shape cross-section has a feature that allows for the passage of the urethra throughout the length of the neophallus. In some examples, the outer shape may have an aspect ratio that that is wider in the horizontal direction than the vertical direction (as shown with respect to FIGS. 19A and 19B).

The distance between the inner surface 1885 and the outer surface 1884 may define a wall thickness of the penile prosthetic shaft 1806. In some examples, the wall thickness may be substantially the same for a majority of the penile prosthetic shaft 1806. In some examples, the wall thickness may be varied radially or axially on the penile prosthetic shaft 1806 for targeted rigidity or flaccidity of the penile prosthetic shaft 1806.

As shown in FIGS. 18A and 18B, the penile prosthetic shaft 1806 may have U-shape that defines a lumen 1882. In some examples, as shown in FIGS. 18A and 18B, the lumen 1882 is an open lumen. In some examples, the lumen 1882 is a closed lumen (e.g., the shape is not U-shaped but circular). In some examples, the lumen 1882 facilitates fluid through the penile prosthetic shaft 1806. In some examples, the penile prosthetic shaft 1806 does not define a lumen but includes a solid core. In some examples, the penile prosthetic shaft 1806 defines multiple lumens.

The lumen 1882 extends through the proximal end portion 1881 and the distal end portion 1883. The penile prosthetic shaft 1806 may defines a first end portion 1886 and a second end portion 1887 that define the ends of the U-shape. For example, the first end portion 1886 extends from the proximal end portion 1881 to the distal end portion 1883 on one side of the U-shape, and the second end portion 1887 extends from the proximal end portion 1881 to the distal end portion 1883 on the other side of the U-shape.

In some examples, the penile prosthetic shaft 1806 includes an elastomeric polymer such as silicone or polyurethane. In some examples, the penile prosthetic shaft 1806 includes a metal material such as nitinol cables and/or plastics such as PEEK, PET, PP. In some examples, the penile prosthetic shaft 1806 includes a non-compliant balloon to inflate to desired shape and size (e.g. PET). In some examples, the penile prosthetic shaft 1806 may use hydraulic fluid to push into the lumen 1882. In some examples, the penile prosthetic shaft 1806 may be constructed from multiple solid segments in which wall thickness and materials may be varied radially or axially on the prosthesis for targeted rigidity or flaccidity of the prosthesis.

FIG. 19A illustrates a penile prosthetic shaft 1906 according to an aspect. FIG. 19B illustrates a cross-section of the penile prosthetic shaft 1906 according to an aspect. The penile prosthetic shaft 1906 may include any of the features with respect to the penile prosthetic shaft 1806 of FIGS. 18A-18B. For example, the penile prosthetic shaft 1906 may be similar to the penile prosthetic shaft 1806 except that the penile prosthetic shaft 1906 includes a wider size than the penile prosthetic shaft 1806.

The penile prosthetic shaft 1906 includes a proximal end portion 1981 and a distal end portion 1883. The penile prosthetic shaft 1906 includes an outer surface 1984 and an inner surface 1985. In some examples, the outer surface 1984 is curved. In some examples, the inner surface 1985 is curved. In some examples, the outer shape of the penile prosthetic shaft 1906 may be round or crescent to fill (e.g., maximally fill) the space of the neophallus to provide additional rigidity and stiffness and mimic a natural penis. In some examples, the shape cross-section has a feature that allows for the passage of the urethra throughout the length of the neophallus. As shown in FIGS. 19A and 19B, the outer shape may have an aspect ratio that that is wider in the horizontal direction than the vertical direction.

The distance between the inner surface 1985 and the outer surface 1984 may define a wall thickness of the penile prosthetic shaft 1906. In some examples, the wall thickness may be varied radially or axially on the penile prosthetic shaft 1906 for targeted rigidity or flaccidity of the penile prosthetic shaft 1806.

As shown in FIGS. 19A and 19B, the penile prosthetic shaft 1906 may have U-shape that defines a lumen 1982 that is wider than the U-shape of FIGS. 18A-18B. In some examples, as shown in FIGS. 19A and 19B, the lumen 1982 is an open lumen. In some examples, the lumen 1982 is a closed lumen (e.g., the shape is not U-shaped but circular). In some examples, the lumen 1982 facilitates fluid through the penile prosthetic shaft 1906. In some examples, the penile prosthetic shaft 1906 does not define a lumen but includes a solid core. In some examples, the penile prosthetic shaft 1906 defines multiple lumens.

The lumen 1982 extends through the proximal end portion 1981 and the distal end portion 1983. The penile prosthetic shaft 1906 may defines a first end portion 1986 and a second end portion 1987 that define the ends of the U-shape. For example, the first end portion 1986 extends from the proximal end portion 1981 to the distal end portion 1983 on one side of the U-shape, and the second end portion 1987 extends from the proximal end portion 1981 to the distal end portion 1983 on the other side of the U-shape.

In some examples, the penile prosthetic shaft 1906 includes an elastomeric polymer such as silicone or polyurethane. In some examples, the penile prosthetic shaft 1906 includes a metal material such as nitinol cables and/or plastics such as PEEK, PET, PP. In some examples, the penile prosthetic shaft 1906 includes a non-compliant balloon to inflate to desired shape and size (e.g. PET). In some examples, the penile prosthetic shaft 1906 may use hydraulic fluid to push into the lumen 1982. In some examples, the penile prosthetic shaft 1906 may be constructed from multiple solid segments in which wall thickness and materials may be varied radially or axially on the prosthesis for targeted rigidity or flaccidity of the prosthesis.

Figure 20:
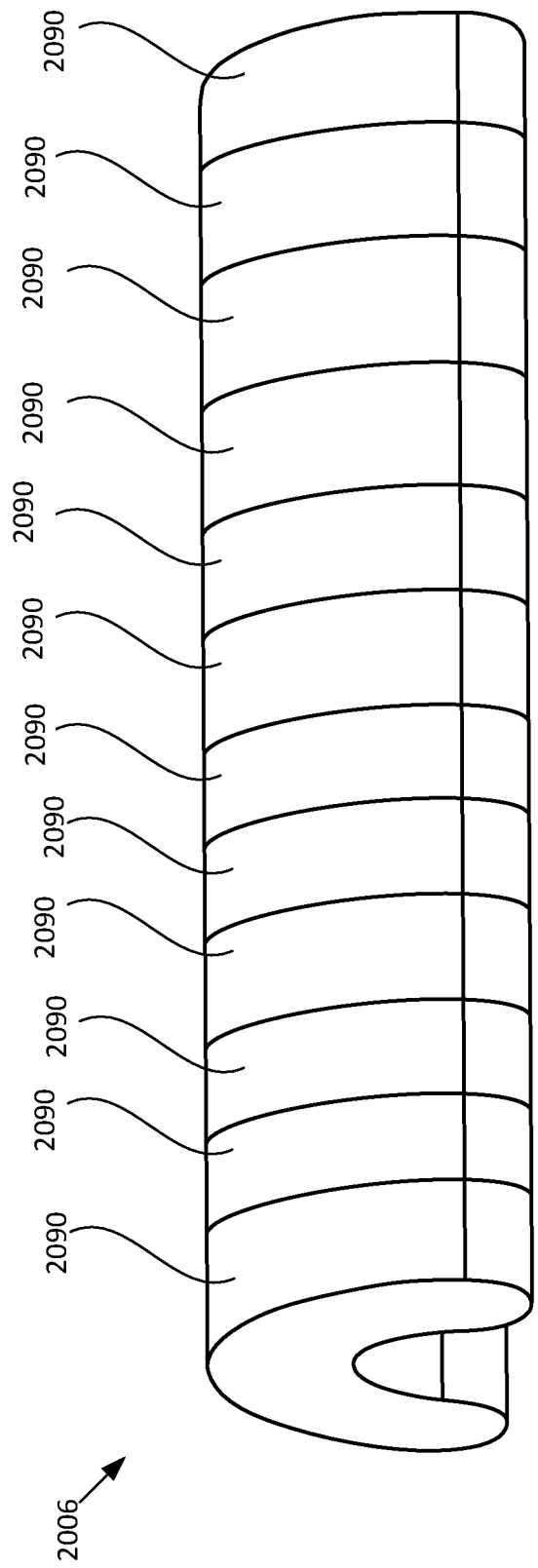
FIG. 20 illustrates a penile shaft according to another aspect.

FIG. 20 illustrates a penile prosthetic shaft 2006 according to another aspect. The penile prosthetic shaft 2006 may be similar to the penile prosthetic shaft 1806 of FIGS. 18A-18B except that the penile prosthetic shaft 2006 is a malleable shaft with articulating linkages 2090.

Figure 21:
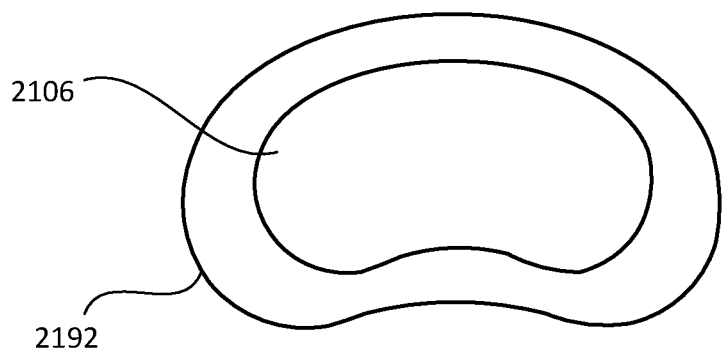
FIG. 21 illustrates a cross-section of a neophallus according to an aspect.
Figure 22:
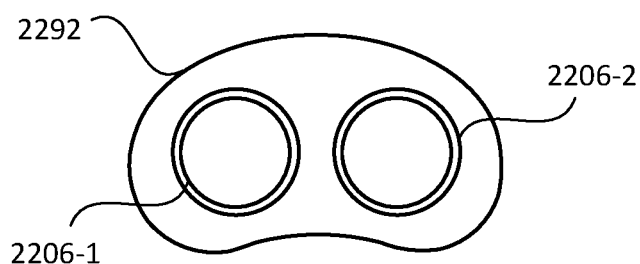
FIG. 22 illustrates a cross-section of a neophallus according to another aspect.
Figure 23:
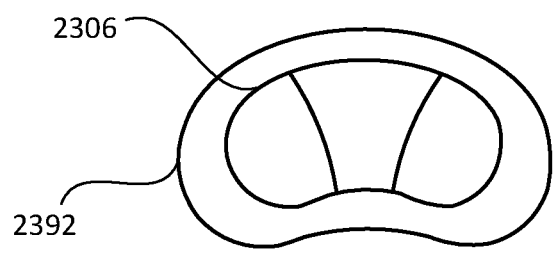
FIG. 23 illustrates a cross-section of a neophallus according to another aspect.
Figure 24:
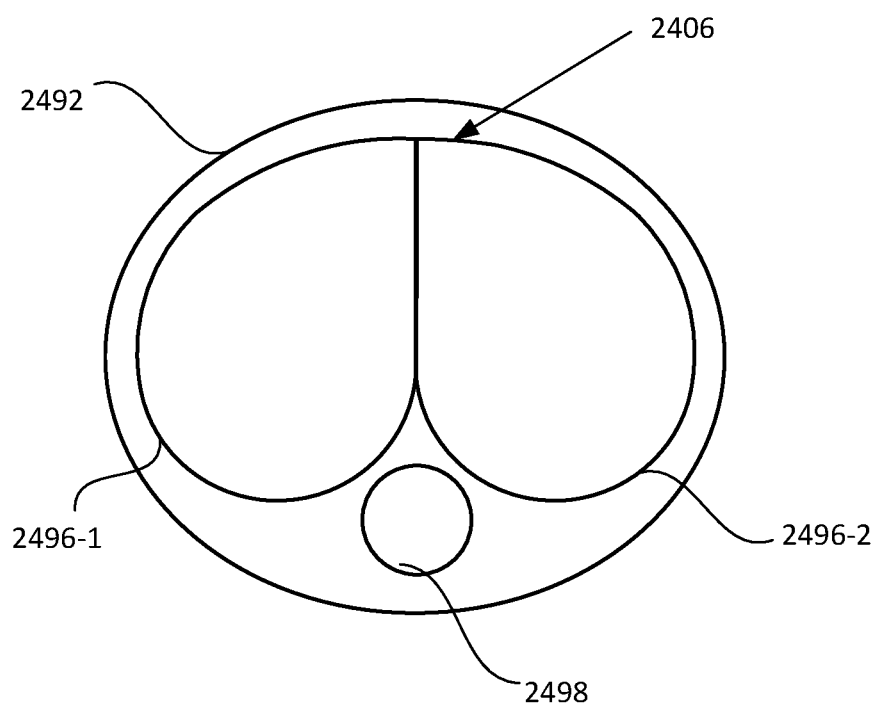
FIG. 24 illustrates a cross-section of a neophallus according to another aspect.

FIGS. 21-24 illustrate cross-sections for single or multi-lumen designs. Wall thickness may be varied for targeted rigidity. FIG. 21 illustrates a cross-section of a neophallus 2192 including a penile prosthetic shaft 2106 with a single lumen. FIG. 22 illustrates a cross-section of a neophallus 2292 including a first penile prosthetic shaft 2206-1 and a second penile prosthetic shaft 2206-2. FIG. 23 illustrates a cross-section of a neophallus 2392 including a penile prosthetic shaft 2306 having multiple lumens. FIG. 24 illustrate a cross-section of a neophallus 2492 showing a penile prosthesis 2406 with a neourethra 2498. The penile prosthesis has a first lobe 2496-1 and a second lobe 2496-2 that accommodates the neourethra 2498.

Figure 25:
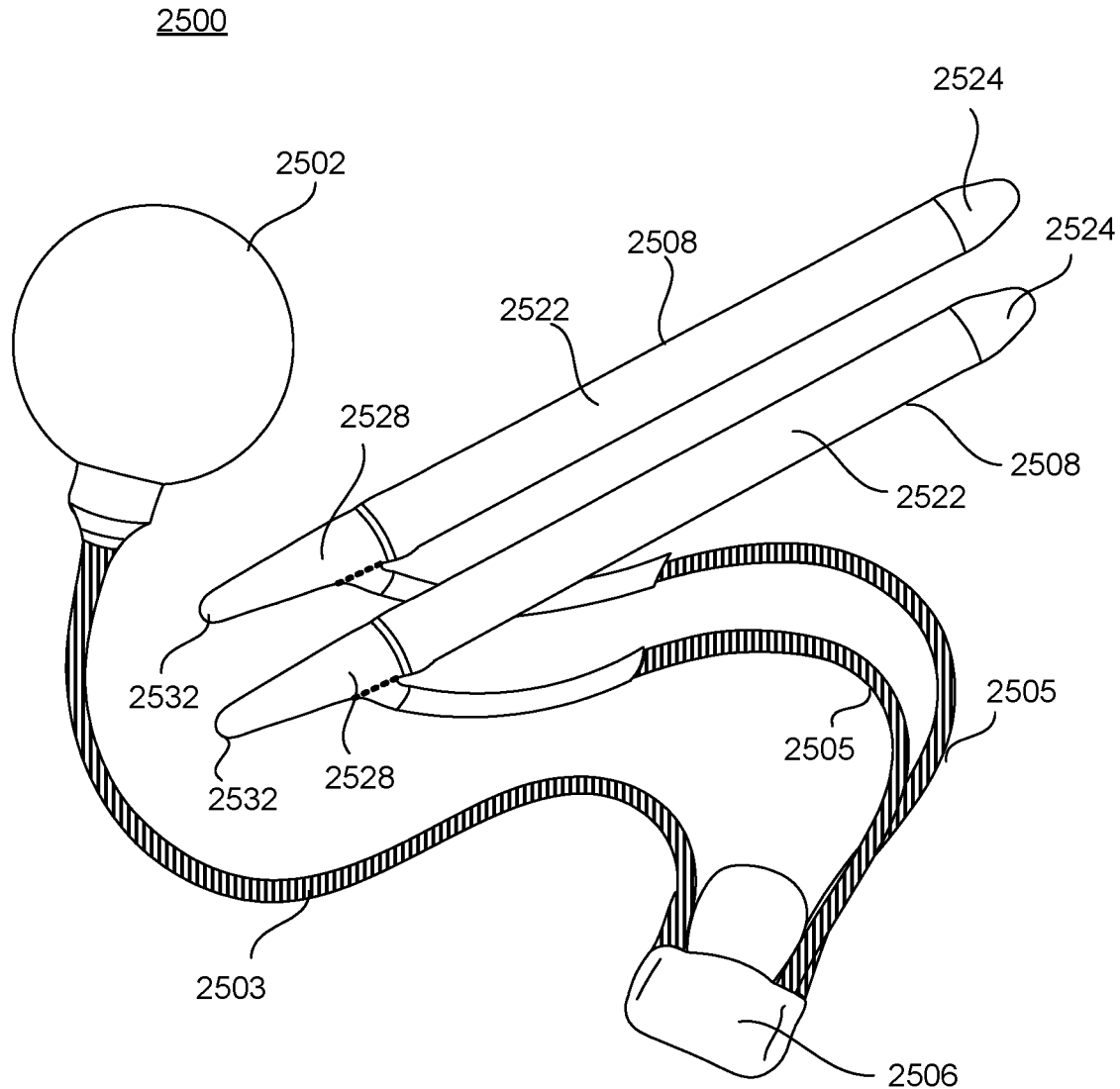
FIG. 25 illustrates an inflatable penile prosthesis according to an aspect.

FIG. 25 illustrates an inflatable penile prosthesis 2500 according to an aspect. The inflatable penile prosthesis 2500 may be used in conjunction with one or more of the anchor plates discussed herein. The inflatable penile prosthesis 2500 may be an example of any of the implantable devices discussed herein and may include any of the features discussed with reference to the previous figures.

The penile prosthesis 2500 may include a pair of cylinders 2508, and the pair of cylinders or inflatable members 2508 are configured to be implanted in a pelvic region. For example, one or both of the cylinders 2508 may be coupled to any of the anchor plates discussed herein. The cylinder 2508 may include a first end portion 2524, a cavity or inflation chamber 2522, and a second end portion 2528 having a rear tip 2532.

The pump assembly 2506 may be implanted into the patient's scrotum. A pair of conduit connectors 2505 may attach the pump assembly 2506 to the pair of inflatable members or cylinders 2508 such that the pump assembly 2506 is in fluid communication with the pair of inflatable members or cylinders 2508. Also, the pump assembly 2506 may be in fluid communication with the fluid reservoir 2502 via a conduit connector 2503. The fluid reservoir 2502 may be implanted into the user's abdomen. The inflation chamber or portion 2522 of the cylinder 2508 may be disposed within the neophallus. The first end portion 2524 of the cylinder 2508 may be at least partially disposed within the glans portion of the neophallus. The second end portion 2528 may be implanted into the patient's pubic region with the rear tip 2532 configured to be attached to any of the anchor plates discussed herein.

The patient may operate the pump assembly 2506 to start an inflation mode, where the pump assembly 2506 is configured to facilitate the transfer of fluid from the fluid reservoir 2502 to the cylinders 2508. In some examples, when the user switches to the deflation mode, at least some of the fluid can automatically be transferred back to the fluid reservoir 2502 (due to the difference in pressure from the cylinders 2508 to the fluid reservoir 2502).

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. An implantable device for penile construction, the implantable device comprising:

a penile prosthesis having a distal end portion and a proximal end portion, the proximal end portion defining an attachment interface;

an anchor plate configured to be coupled to a pelvic bone of a patient, the anchor plate having an attachment interface configured to be coupled to the attachment interface of the penile prosthesis, the anchor plate having a first portion, a second portion, and a central portion disposed between the first portion and the second portion such that a central axis of the anchor plate extends through the central portion at a location equidistant from the first portion and the second portion, the first portion being formed of a first material, the central portion being formed of a second material, the second material being more flexible than the first material, the anchor plate having a side edge extending from a first corner portion to a second corner portion, the side edge being curved from the first corner portion to the second corner portion such that a midportion of the side edge between the first corner portion and the second corner portion is disposed closer to the central axis of the anchor plate than the first corner portion is disposed to the central axis of the anchor plate and the midportion of the side edge between the first corner portion and the second corner portion is disposed closer to the central axis of the anchor plate than the second corner portion is disposed to the central axis of the anchor plate.

2. The implantable device of claim 1, wherein the attachment interface of the penile prosthesis defines a protrusion having a proximal tip and a reduced portion, the attachment interface of the anchor plate defining an opening.

3. The implantable device of claim 1, wherein the attachment interface of the anchor plate is a first attachment interface, the anchor plate including a second attachment interface, the penile prosthesis includes a first inflatable cylinder and a second inflatable cylinder, the first inflatable cylinder configured to be coupled to the first attachment interface, the second inflatable cylinder configured to be coupled to the second attachment interface.

4. The implantable device of claim 1, wherein the first portion of the anchor plate defines a through hole configured to receive a bone screw.

5. The implantable device of claim 1, wherein the penile prosthesis includes an adjustable member configured to increase over time to assist with a creation of a neophallus.

6. The implantable device of claim 1, wherein the penile prosthesis includes a penile prosthesis originally designed for erectile dysfunction.

7. The implantable device of claim 1, wherein the penile prosthesis includes a neophallus implant.

8. The implantable device of claim 1, wherein the anchor plate includes a first anchor member and a second anchor member.

9. The implantable device of claim 1, wherein the penile prosthesis includes an elongated penile shaft defining a lumen.

10. The implantable device of claim 1, wherein the penile prosthesis includes an inflatable cylinder.

* * * * *